US007222552B2

(12) United States Patent
Kouno et al.

(10) Patent No.: US 7,222,552 B2
(45) Date of Patent: May 29, 2007

(54) CONTROLLER FOR TRANSMISSION

(75) Inventors: Toshikazu Kouno, Wako (JP); Eijiro Shimabukuro, Wako (JP); Yuji Yasui, Wako (JP); Junya Tachikawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 11/107,729

(22) Filed: Apr. 18, 2005

(65) Prior Publication Data
US 2005/0230216 A1 Oct. 20, 2005

(30) Foreign Application Priority Data
Apr. 20, 2004 (JP) ............... 2004-123755

(51) Int. Cl.
*F16H 61/12* (2006.01)
(52) U.S. Cl. ................... 74/336 R; 477/906
(58) Field of Classification Search ............. 74/473.12; 701/64
See application file for complete search history.

(56) References Cited

U.S. PATENT DOCUMENTS

| 6,785,599 | B2 * | 8/2004 | Berger et al. ................. 701/51 |
| 2003/0064855 | A1 * | 4/2003 | Tanaka et al. ............... 477/115 |
| 2004/0145321 | A1 * | 7/2004 | Yasui et al. ................. 318/135 |

FOREIGN PATENT DOCUMENTS

| JP | 11-22816 | 1/1999 |
| JP | 2000-46176 | 2/2000 |
| JP | 2002-71005 | 3/2002 |

\* cited by examiner

*Primary Examiner*—Roger Pang
*Assistant Examiner*—Edwin A. Young
(74) *Attorney, Agent, or Firm*—Westerman, Hattori, Daniels & Adrian, LLP.

(57) ABSTRACT

A controller for a transmission capable of preventing an occurrence of a gear squeak caused by a malfunction of a synchronization mechanism. The voltage determination section 24 performs a shift operation of a transmission by determining a control input Vin to a shift motor 13 so as to match an actual position Psc of a coupling sleeve 6 grasped by an actual position grasping section 21 with a target position Psc_cmd of the coupling sleeve 6 set by a target position setting section 22. After starting the shift operation of the transmission, it halts the shift operation by detecting a malfunction in the gear position where the shift operation is under execution when the actual position Psc of the coupling sleeve 6 has reached a malfunction judgment position provided within a range from a balk point to a contact point between the coupling sleeve 6 and an idle gear 7c before a difference Esc between the actual position Psc and the target position Psc_cmd of the coupling sleeve 6 exceeds a given contact judgment value.

6 Claims, 16 Drawing Sheets a : VPOLE = -1
b : VPOLE = -0.8
c : VPOLE = -0.5

FIG. 6
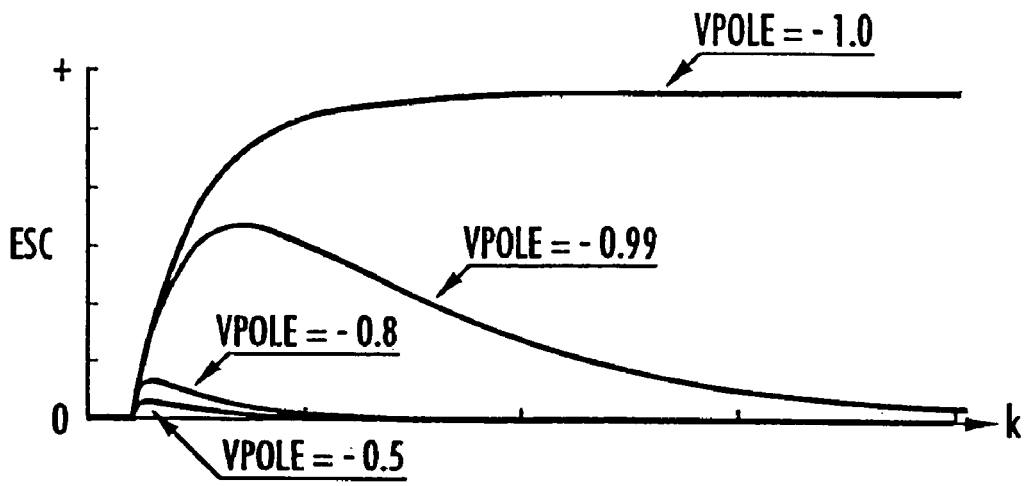
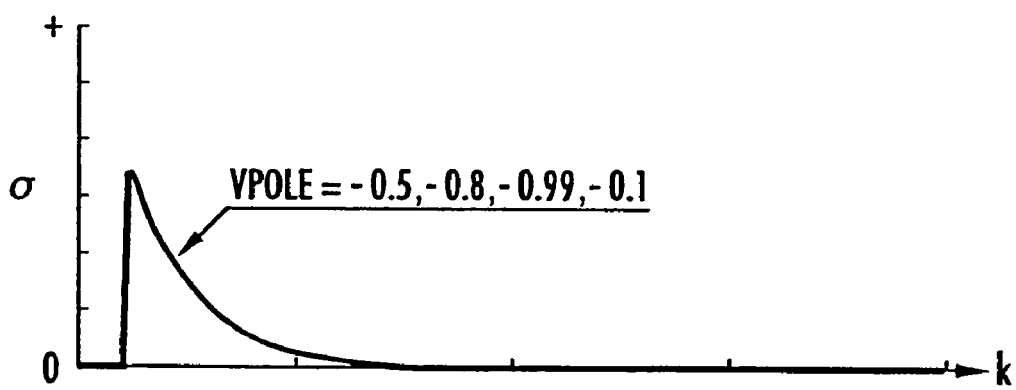
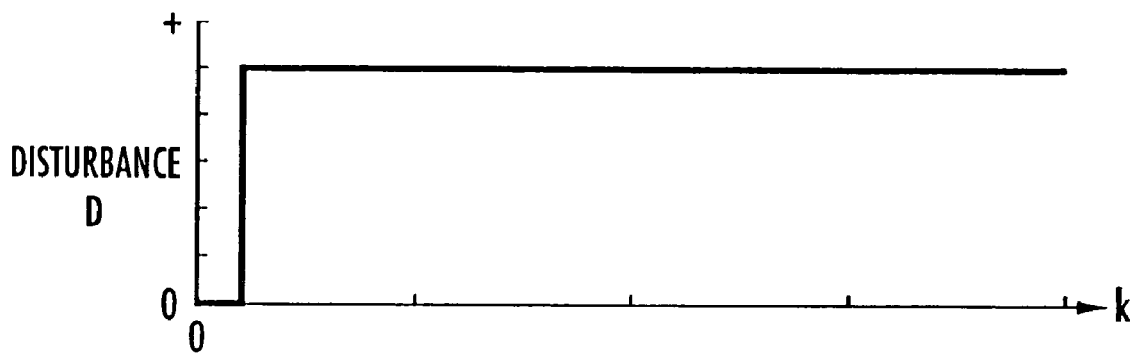

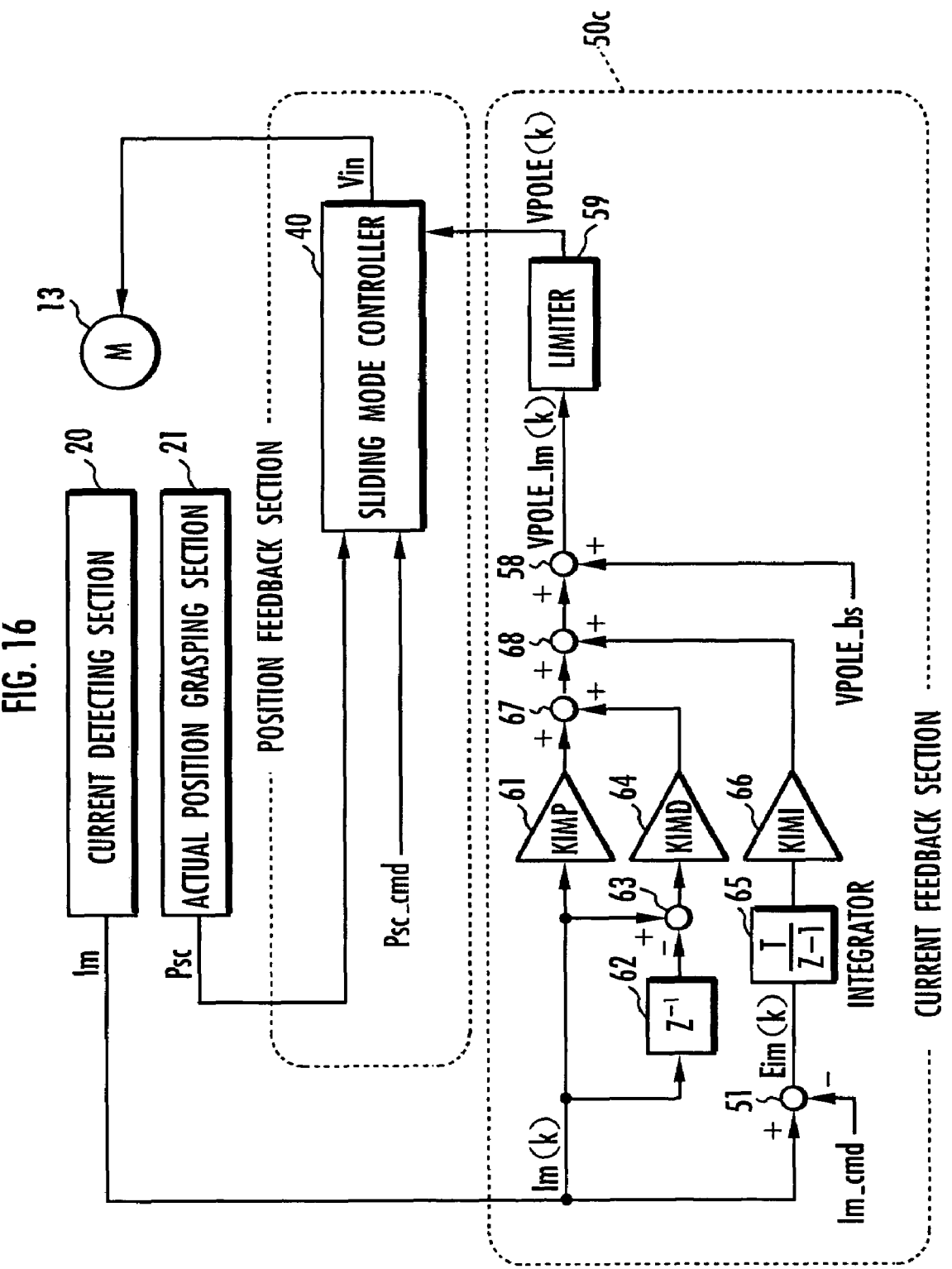

CONTROLLER FOR TRANSMISSION

BACKGROUND OF THE INVENTION

1. Field of the Invention

The present invention relates to a controller for a transmission having a synchronization mechanism for the number of revolutions, and more particularly to a controller for a transmission having a function of detecting a malfunction in a synchronization mechanism.

2. Related Background Art

There is an already known vehicle-mounted transmission such as an automatic/manual transmission (AMT), in which a motor or some other actuator is used to perform a select operation and a shift operation of a manual transmission (MT) for transmitting power between an input shaft and an output shaft by means of a select operation and a shift operation with a driver's manual operation.

In this type of controller for an automatic manual transmission, the shift operation is performed after synchronizing the number of revolutions of a coupling sleeve with that of an idle gear with the coupling sleeve put in contact with the idle gear arranged relatively rotatable on an input shaft via a synchronizer ring by moving the coupling sleeve rotating integrally with the input shaft. Moreover, it is possible to reduce a shift shock to a driver and to protect the synchronization mechanism for the number of revolutions for long life by absorbing a shock at the synchronization of the number of revolutions.

Therefore, there has been suggested a controller that detects a position (a balk point) where a synchronous friction begins to occur between a synchronizer ring and an idle gear by a rate of change in the number of revolutions of an input shaft, moves a coupling sleeve smoothly with a higher setting of a pressure applied to the coupling sleeve from the start of a shift operation to the balk point, and absorbs a shift shock with a lower setting of the pressure from the balk point (for example, refer to Japanese Laid-Open Patent Publication (Kokai) No. H11-22816 (1999-22816)).

In addition, there has been suggested a controller that determines a balk point by a rate of change in the number of revolutions of an input shaft after starting a shift operation and sets driving current of a shift actuator from the balk point and after to an initial synchronizing current value proportional to a shift load (for example, refer to Japanese Laid-Open Patent Publication (Kokai) No. 2000-46176).

Furthermore, there has been suggested a controller that calculates a progress of a coupling sleeve in a shift operation on the basis of a position, displacement, speed, or the like of the coupling sleeve and determines an occurrence of a gear squeak by the progress (for example, refer to Japanese Laid-Open Patent Publication (Kokai) No. 2002-71005).

In this regard, if the synchronizer ring does not apply the synchronous action in the number of revolutions any more due to an occurrence of a malfunction in the synchronization mechanism when an output of an actuator from the balk point and after is controlled on the basis of the pressure or the shift load in the shift operation of the transmission, the coupling sleeve abuts an idle gear with the number of revolutions being asynchronous, thereby causing a so-called gear squeak.

Furthermore, the above detection of the occurrence of the gear squeak based on the progress of the coupling sleeve is conducted to determine whether the gear squeak has actually occurred. Therefore, it is not available for preventing a damage of the synchronization mechanism associated with the gear squeak.

SUMMARY OF THE INVENTION

Therefore, it is an object of the present invention to provide a controller for a transmission capable of preventing a gear squeak caused by a malfunction in a synchronization mechanism.

The present invention has been provided to achieve the above object. It relates to a controller for controlling an operation of a transmission including a plurality of gear positions having a coupling sleeve integrally rotatable on an input shaft or an output shaft with a shift fork coupled to the coupling sleeve, idle gears arranged so as to be relatively rotatable on the shaft on which the coupling sleeve is arranged and not axially movable on the shaft and coupled to one of the input shaft and the output shaft where the coupling sleeve is not arranged, and a synchronizer ring for synchronizing the number of revolutions between the coupling sleeve and the idle gear by means of a frictional force by contacting the coupling sleeve with the idle gear in a shift operation, the synchronizer ring being arranged so as to be freely rotatable on the coupling sleeve and the idle gear and arranged so as to be movable in a direction of the shaft on which the coupling sleeve is arranged; and a shift actuator for engaging the coupling sleeve with the idle gear by axially moving the coupling sleeve with operating the shift fork of each gearshift position.

The controller comprises actual position grasping means for grasping an actual position of the coupling sleeve; shift position control means for performing the shift operation of the transmission by determining a control input to the shift actuator so that an actual position of the coupling sleeve matches a predetermined target position; and gear position malfunction detecting means for detecting a malfunction in a gear position under execution of the shift operation when the actual position of the coupling sleeve has reached a malfunction judgment position set within a range from a balk point to just before a contact point between the coupling sleeve and the idle gear without causing a difference between the actual position and the target position of the coupling sleeve to be greater than or equal to a predetermined contact judgment value after starting the shift operation of the transmission.

According to this aspect of the present invention, if the actual position of the coupling sleeve has reached the malfunction judgment position set within the range from the balk point to just before the contact point between the coupling sleeve and the idle gear without causing the difference between the actual position and the target position of the coupling sleeve to be equal to or greater than the predetermined contact judgment value after starting the shift operation, it is determined that the synchronizer ring moves to the malfunction judgment position without resistance of the synchronizer ring and therefore the synchronizer ring is unsuccessful in synchronizing the number of revolutions between the coupling sleeve and the idle gear. Accordingly, if so, the gear position malfunction detecting means can detect the malfunction in the gear position where the shift operation is under execution.

Moreover, the shift position control means halts the shift operation if the gear position malfunction detecting means detects a malfunction in the gear position where the shift operation is under execution.

According to this feature, the shift position control means halts the shift operation, thereby preventing the coupling sleeve from abutting the idle gear and preventing an occurrence of a gear squeak.

Moreover, the input shaft of the transmission is connected to an output shaft of a driving source. If the gear position malfunction detecting means detects a malfunction in the gear position where upshift is under execution as the shift operation, the shift position control means performs a shift operation for a one-step higher gear position than the gear position where the malfunction is detected if it is possible to perform the shift operation for the one-step higher gear position without halting the driving source and performs a shift operation for a one-step lower gear position than the gear position where the malfunction is detected if it is impossible to perform the shift operation for the one-step higher gear position than the gear position where the malfunction is detected without halting the driving source.

According to this feature, if a malfunction has occurred in the gear position where the shift operation is to be performed, the upshift operation can be continued under the condition where the driving source does not halt. On the other hand, if the upshift operation halts the driving source, the transmission can continue to transmit power without halting the driving source by performing the shift operation for the one-step lower gear position.

Moreover, the input shaft of the transmission is connected to an output shaft of a driving source. If the gear position malfunction detecting means detects a malfunction in the gear position where downshift is under execution as the shift operation, the shift position control means performs a shift operation for a one-step lower gear position than the gear position where the malfunction is detected if it is possible to perform the shift operation for the one-step lower gear position with the number of revolutions of the driving source not exceeding the rated number of revolutions and performs a shift operation for a one-step higher gear position than the gear position where the malfunction is detected if it is impossible to perform the shift operation for the one-step lower gear position than the gear position where the malfunction is detected with the number of revolutions of the driving source not exceeding the rated number of revolutions.

According to this feature, if a malfunction has occurred in the gear position where the shift operation is to be performed, the downshift operation can be continued under the condition where the number of revolutions of the driving source does not exceed the rated number of revolutions. On the other hand, if the downshift operation causes the number of revolutions of the driving source to exceed the rated number of revolutions, the transmission can continue to transmit power with the number of revolutions of the driving source smaller than or equal to the rated number of revolutions by performing the shift operation for the one-step higher gear position.

Furthermore, the shift position control means determines the control input to the shift motor by using a response specification control with a variably specifiable damping behavior and damping speed of a difference between the actual position and the target position of the coupling sleeve so as to obtain matching between the actual position and the target position of the coupling sleeve in such a way as to converge a state quantity on an equilibrium point on a switching function defined by a linear function with the state quantity assumed a variable on the assumption that at least the difference is the state quantity and determines response characteristics of the response specification control by changing an operational coefficient of the linear function.

According to this feature, when the shift operation is controlled by using the response specification control so that the actual position of the coupling sleeve matches the target position by varying disturbance-control capabilities with a change in the operational coefficient of the linear function, the gear position malfunction detecting means can easily detect a malfunction in the gear position by using the difference between the actual position and the target position of the coupling sleeve for use in the control.

BRIEF DESCRIPTION OF THE DRAWINGS

FIG. 6 is a graph showing an effect of changing a compliance parameter.

FIG. 16 is a control block diagram of still another example of a controller with an additional current feedback section.

DETAILED DESCRIPTION OF THE PREFERRED EMBODIMENTS

Figure 1:
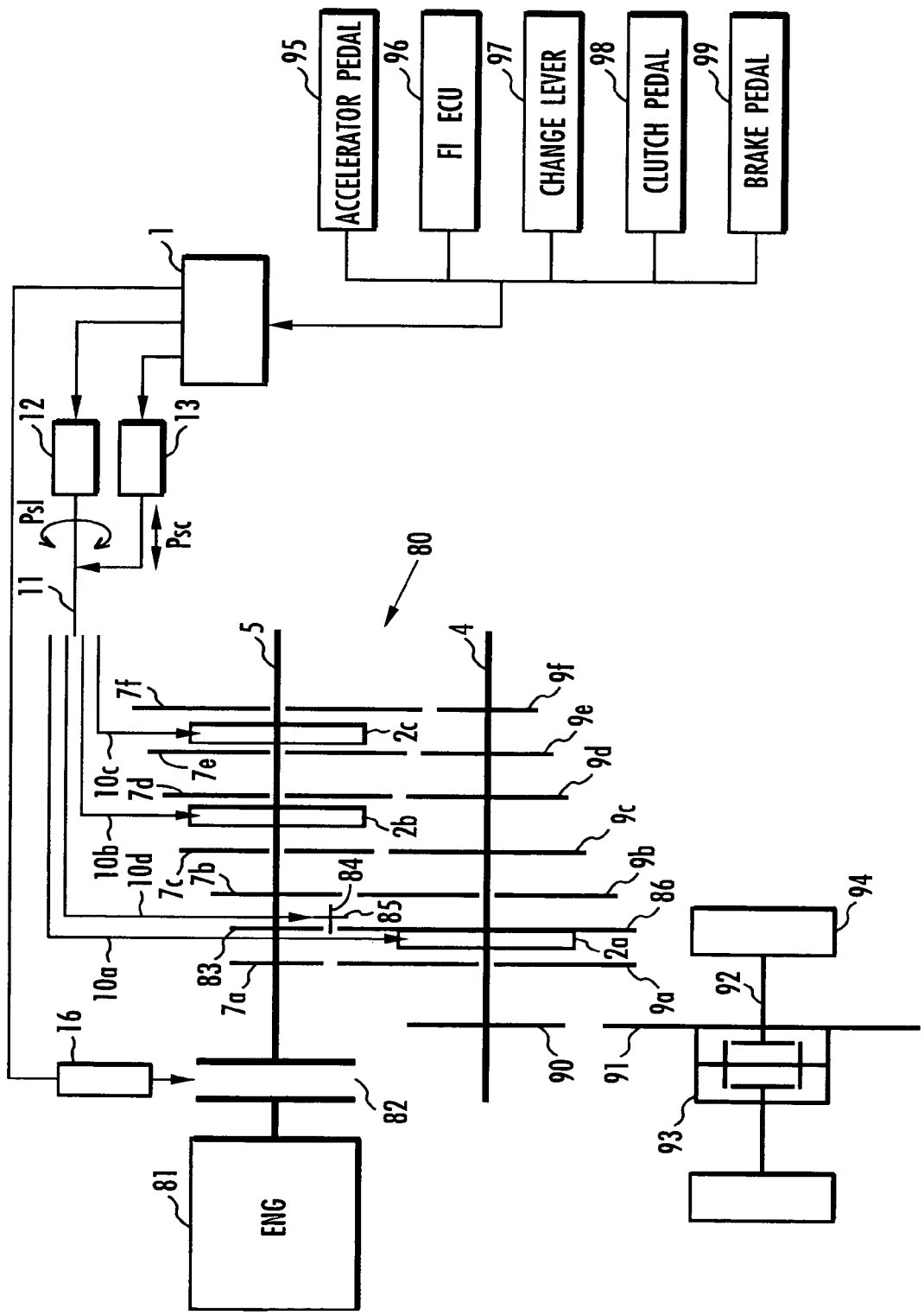
FIG. 1 is a schematic diagram of a transmission.
Figure 2:
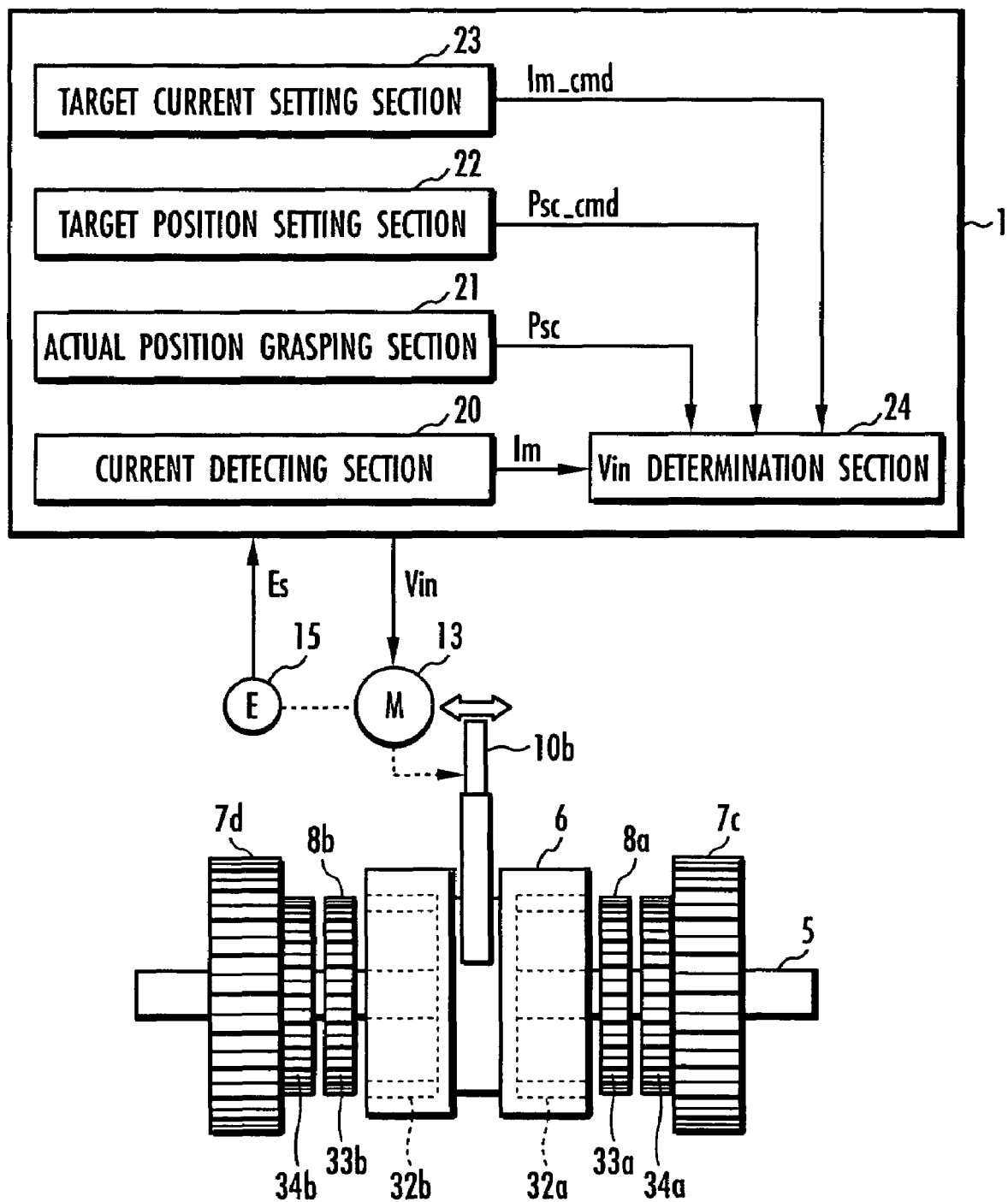
FIG. 2 is a schematic diagram of a synchronization mechanism included in the transmission shown in FIG. 1 and of a controller therefor.
Figure 3:
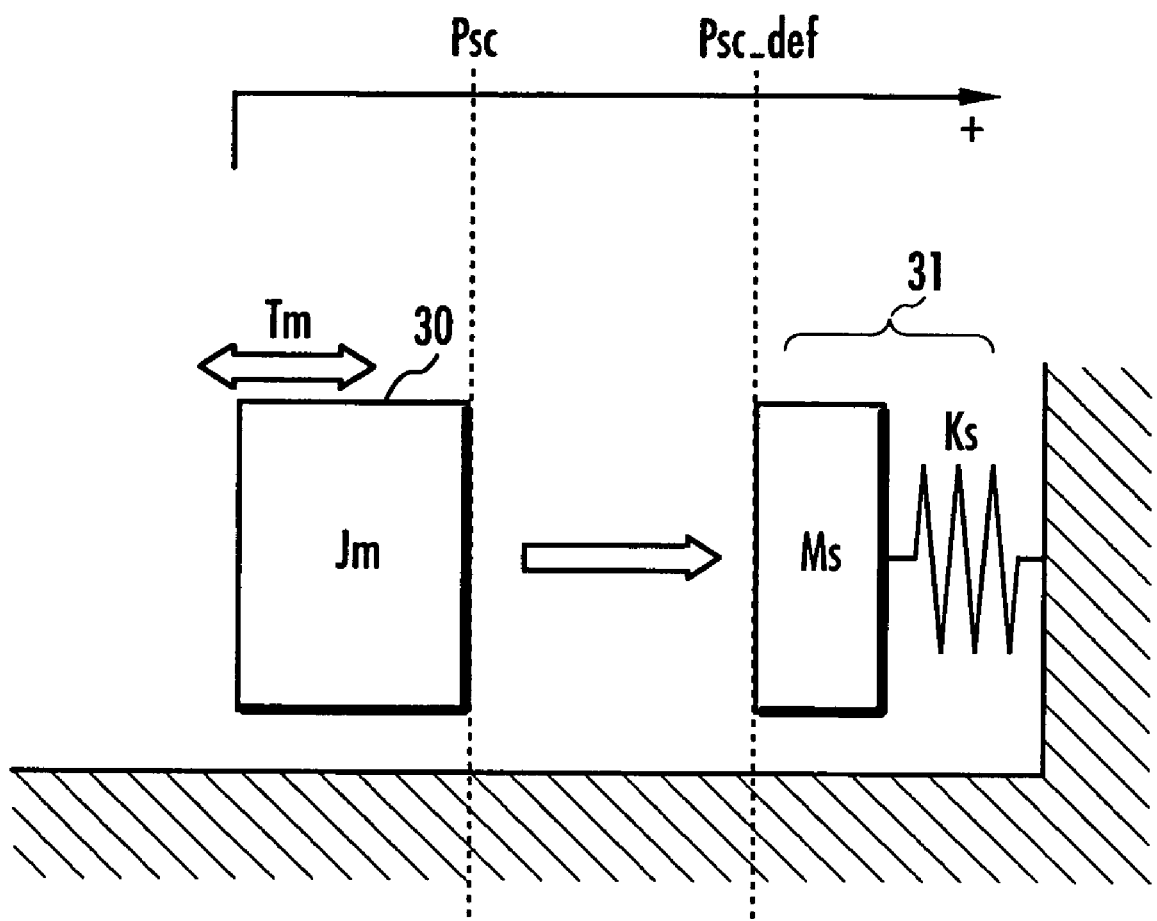
FIG. 3 is an illustration of modeling the synchronization mechanism shown in FIG. 2.
Figure 4:
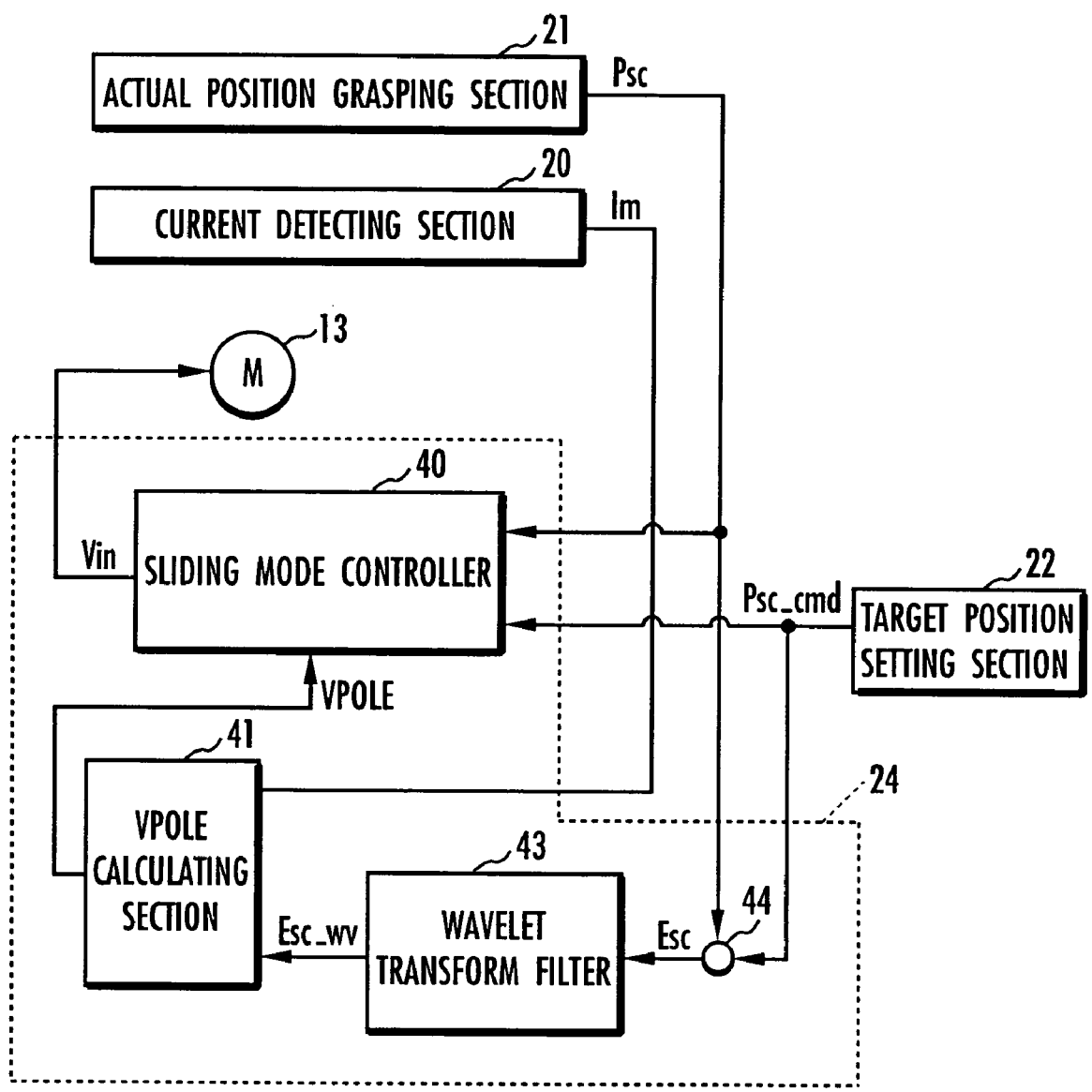
FIG. 4 is a control block diagram of the controller shown in FIG. 2.
Figure 5:
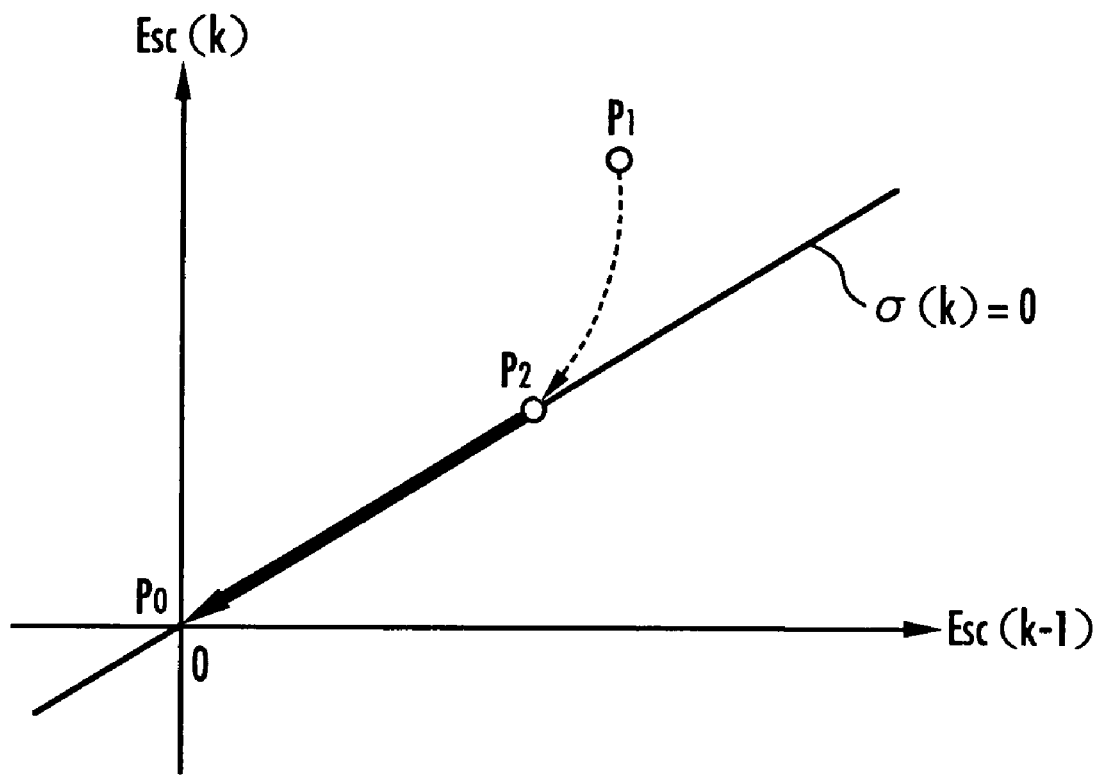
FIG. 5 is a graph showing a behavior of a sliding mode controller shown in FIG. 4.
Figure 5:
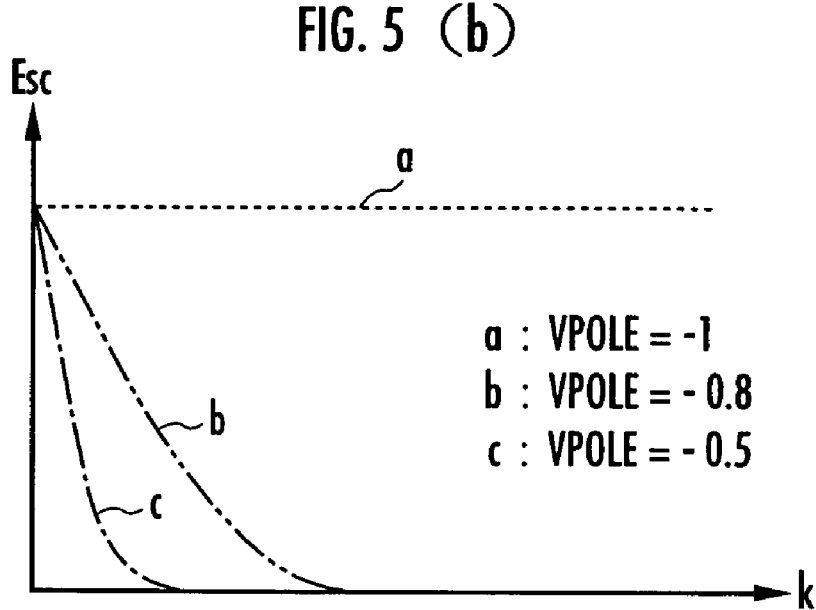
Figure 7:
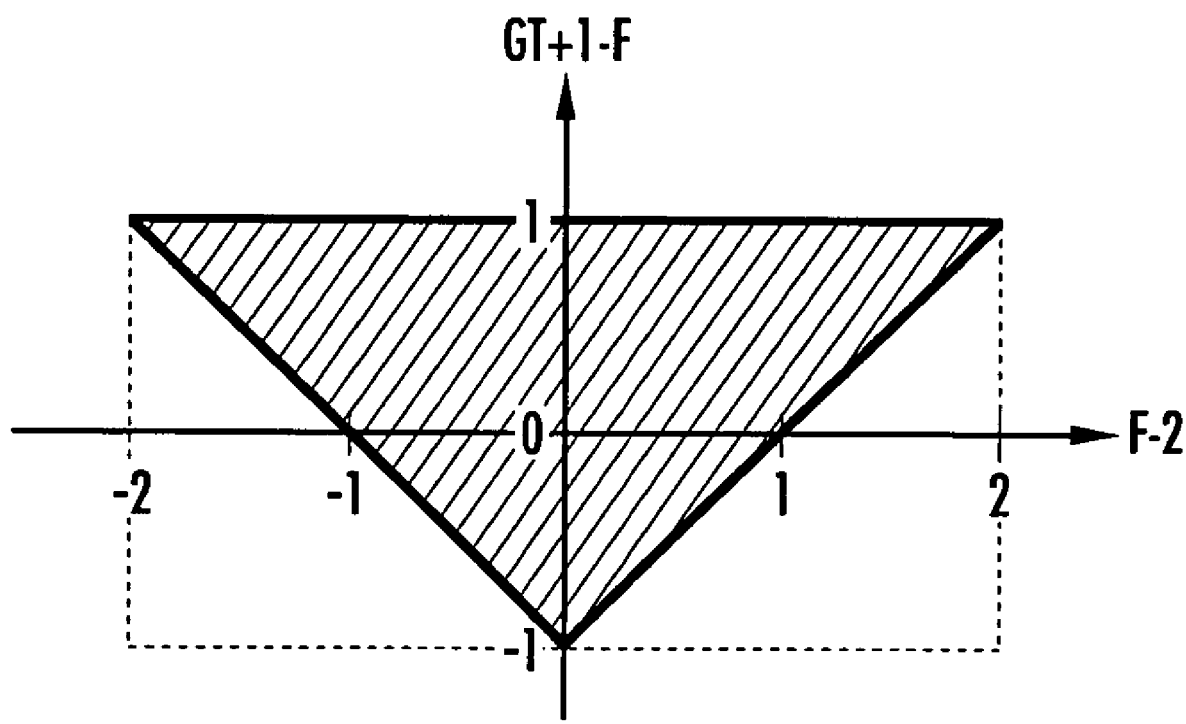
FIG. 7 is a graph showing conditions for setting a reaching law gain and an adaptation law gain.
Figure 8:
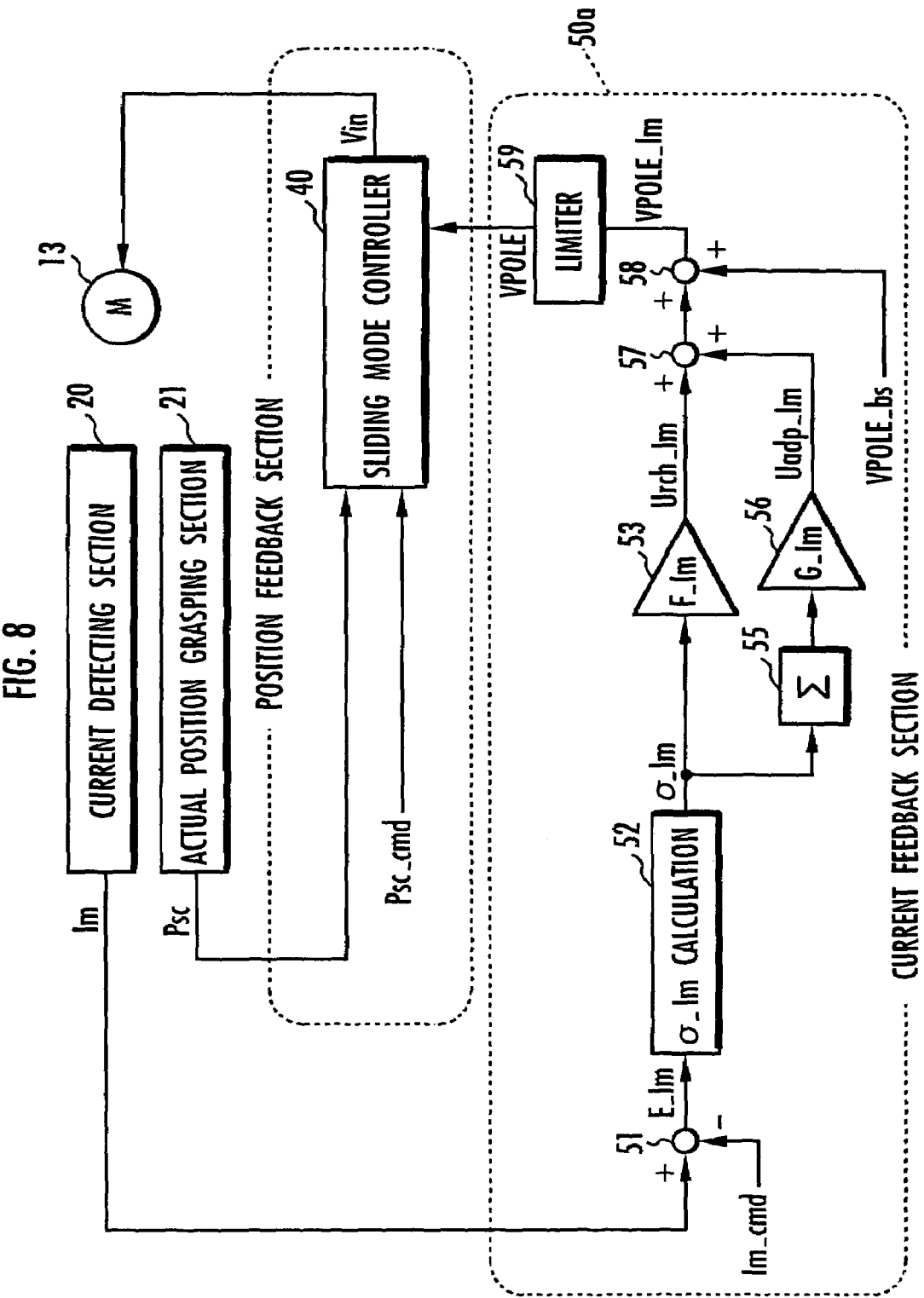
FIG. 8 is a control block diagram of a controller with an additional current feedback section.
Figure 9:
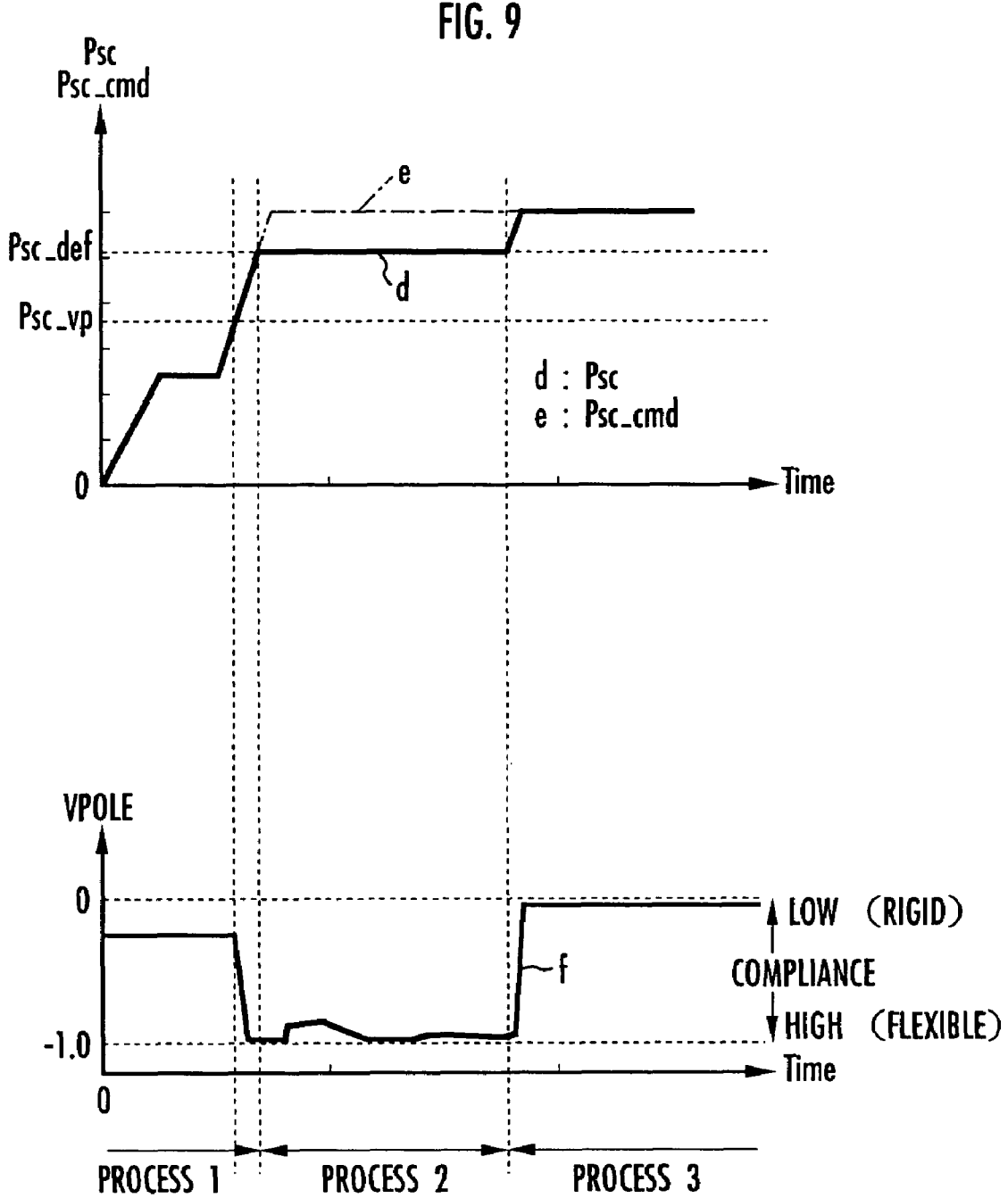
FIG. 9 is a graph showing a switching timing for a control process.
Figure 10:
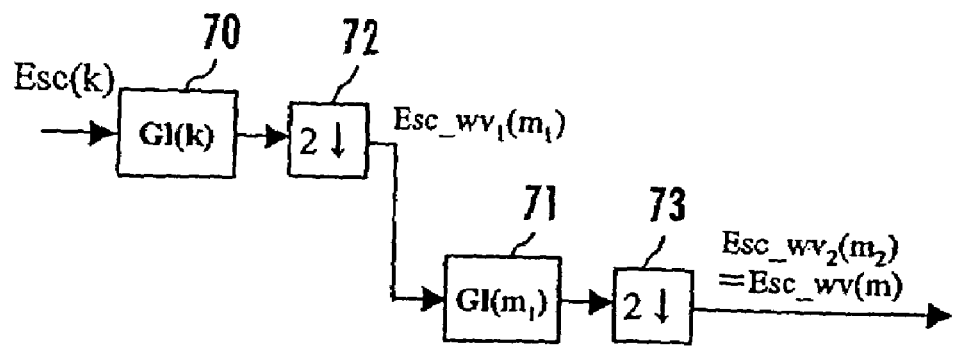
FIG. 10 is a schematic diagram of a wavelet transform filter.
Figure 10:
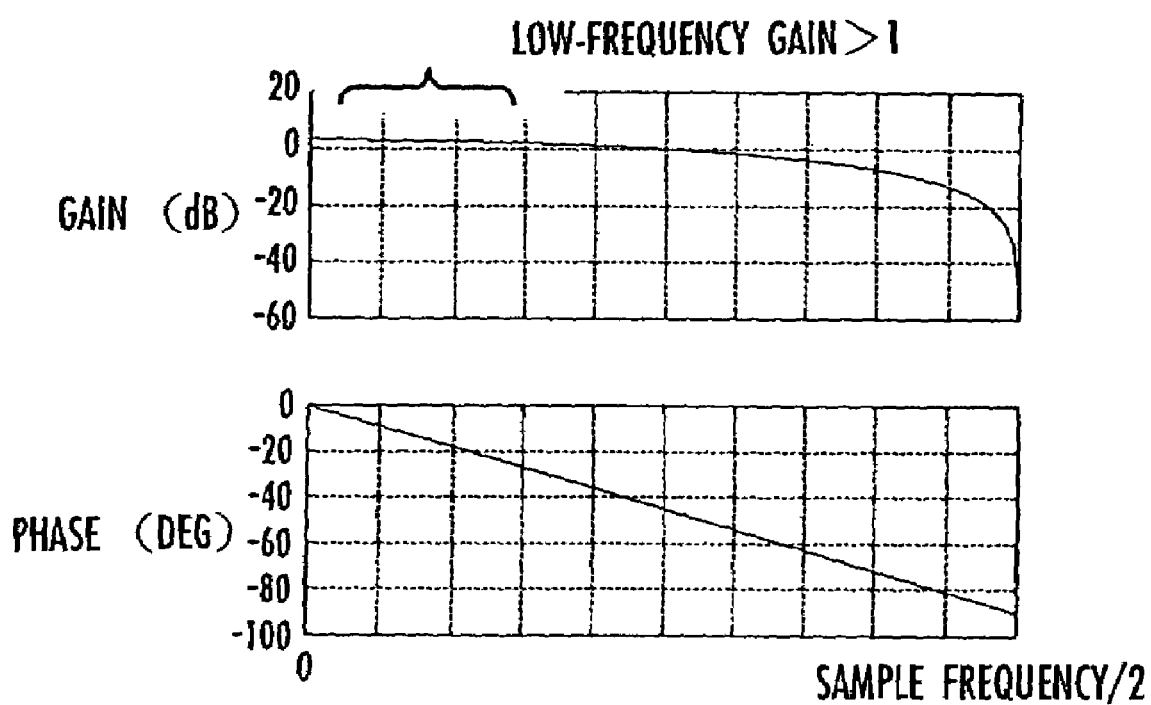
Figure 11:
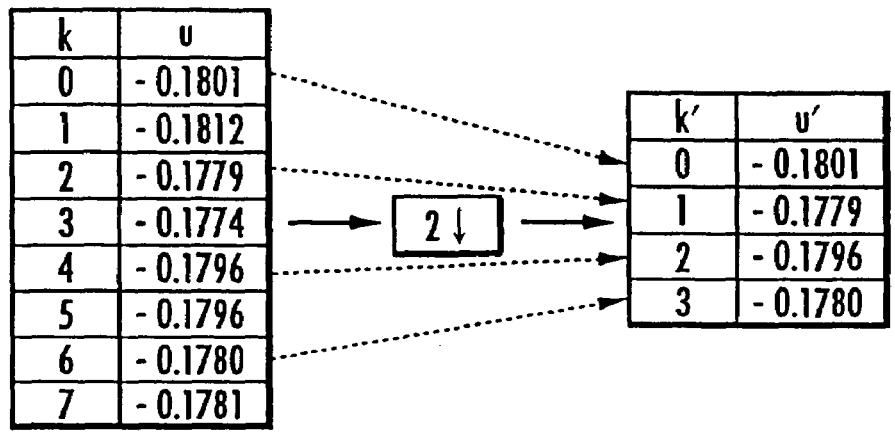
FIG. 11 is an illustration of decimation in the wavelet transform filter.
Figure 11:
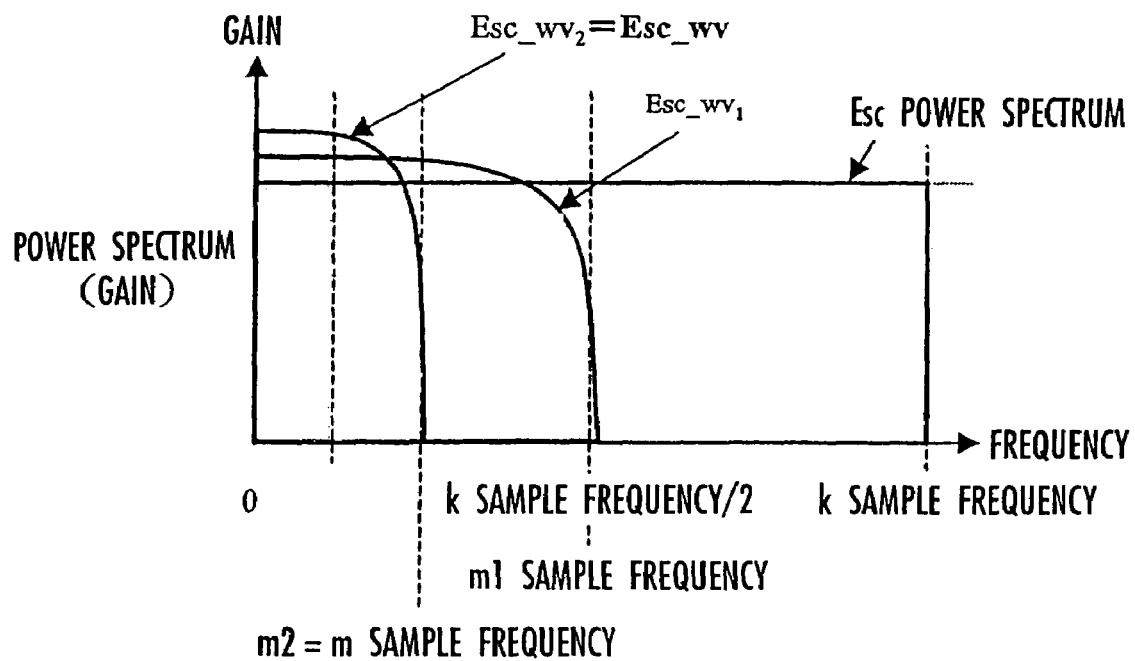
Figure 12A:
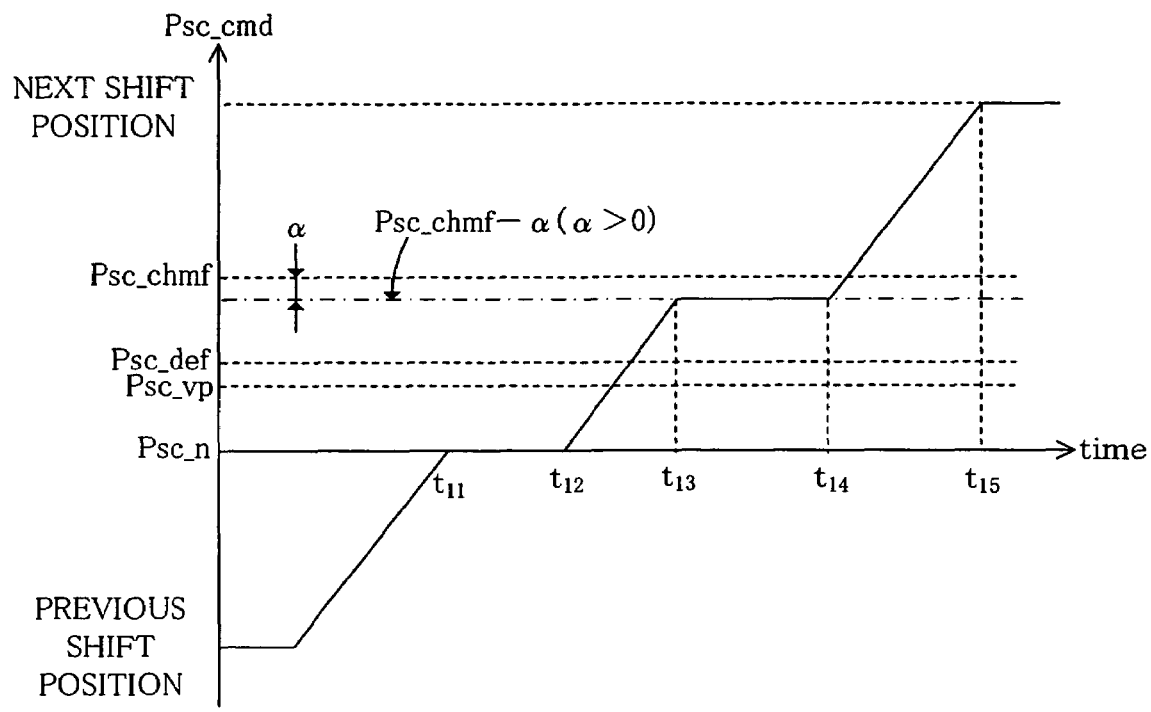
FIG. 12 is a diagram showing a table for setting a target position and a compliance parameter.
Figure 12B:
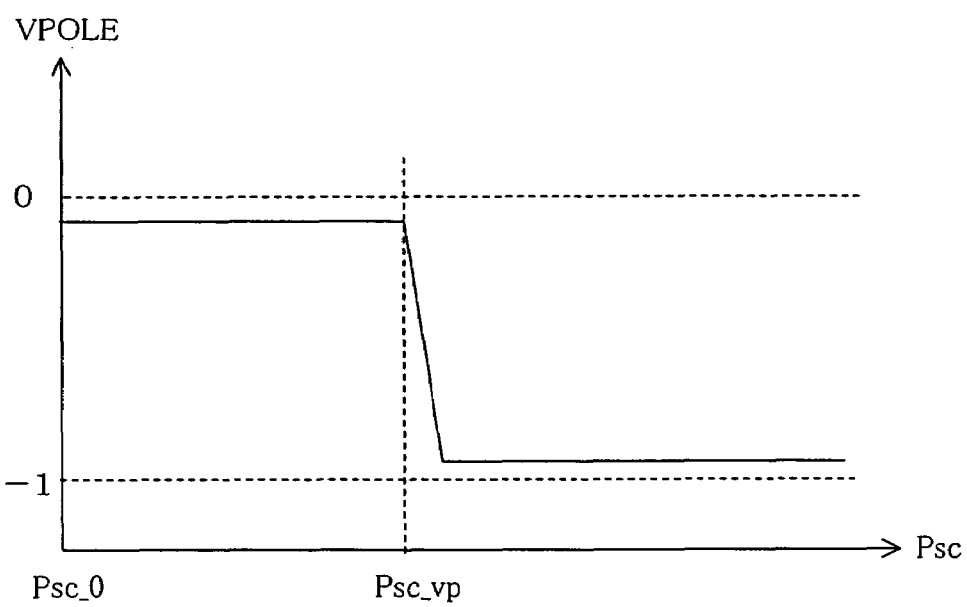
Figure 13:
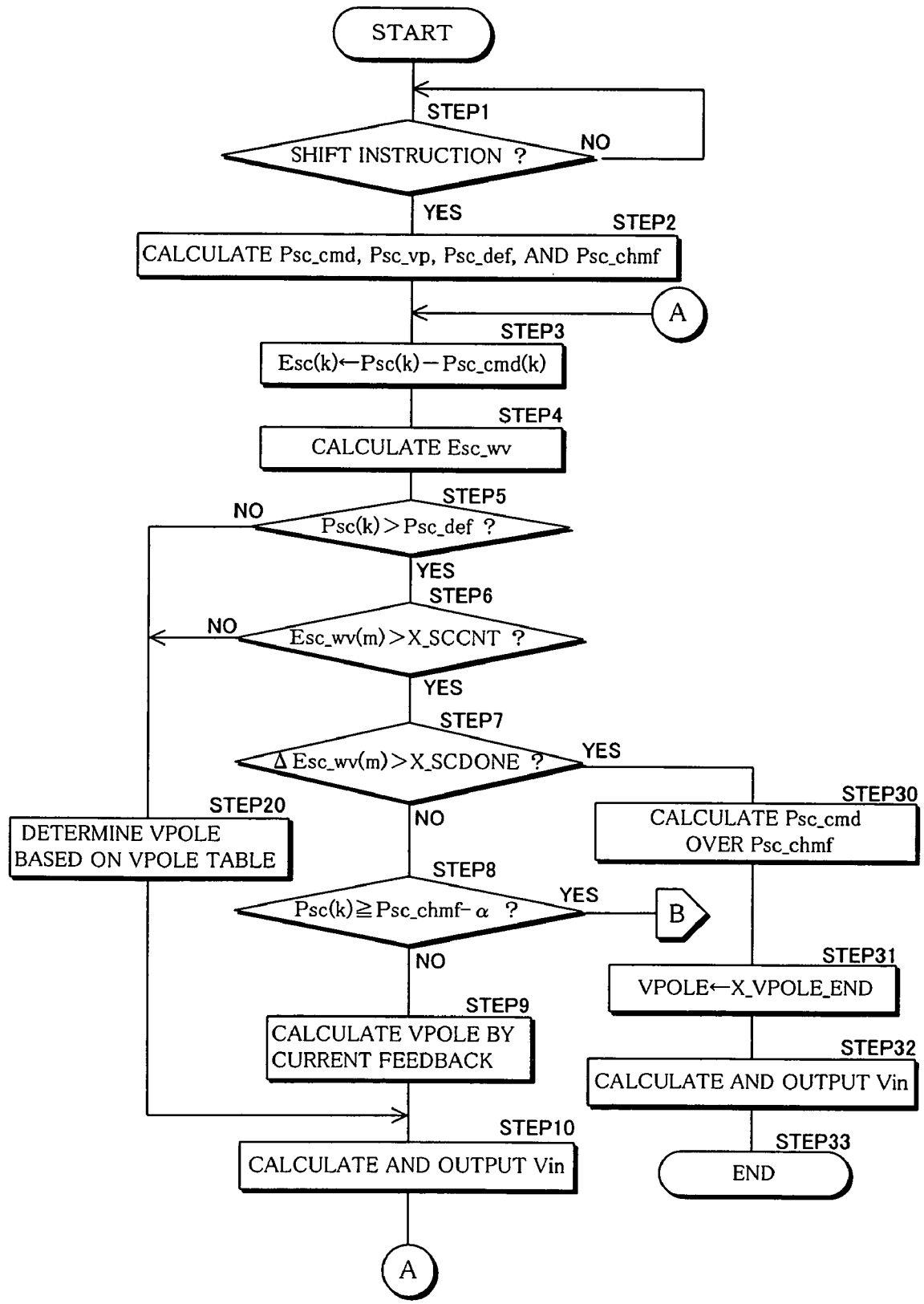
FIG. 13 is a flowchart of operating the controller.
Figure 14:
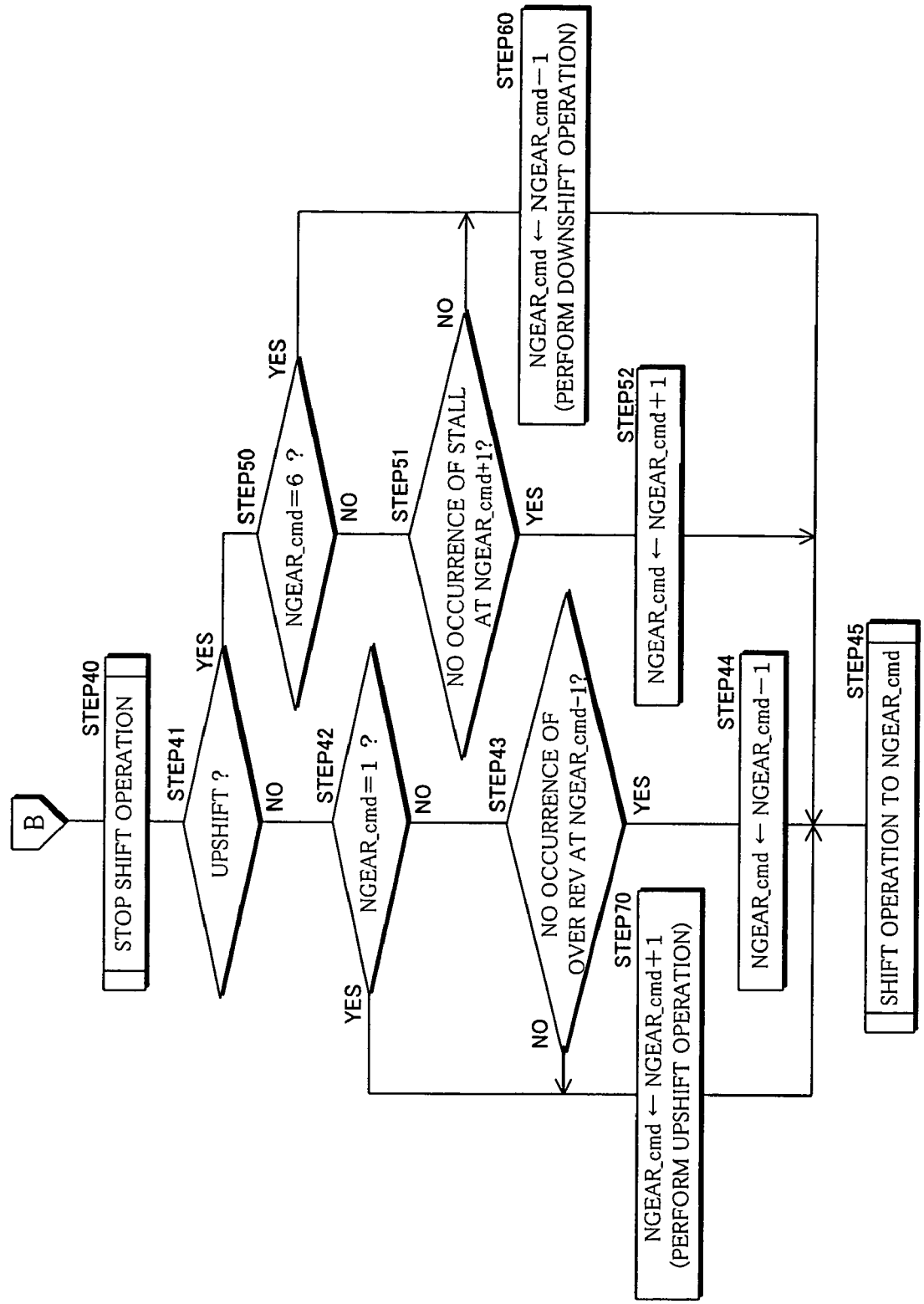
FIG. 14 is a flowchart of operating the controller.
Figure 15:
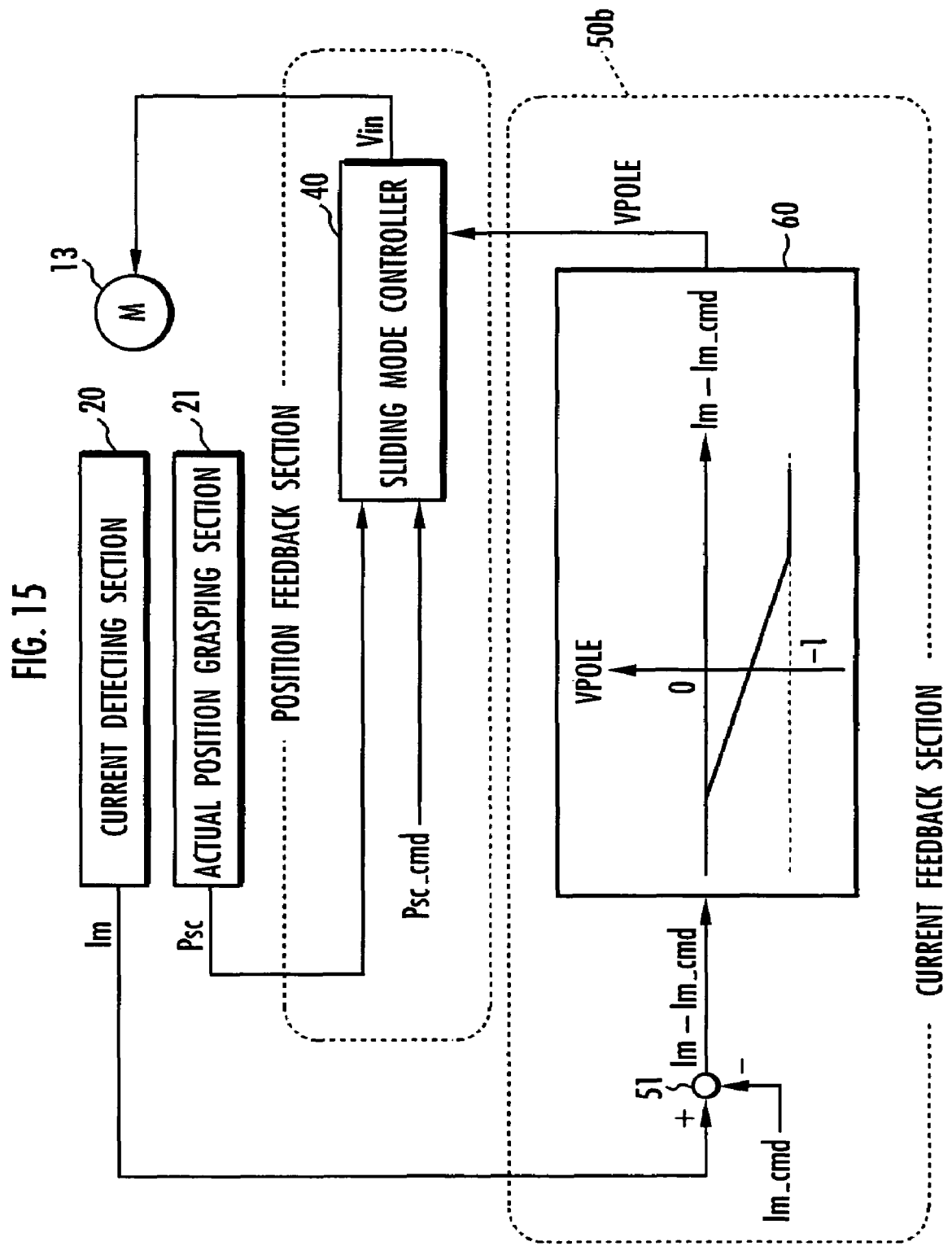
FIG. 15 is a control block diagram of another example of a controller with an additional current feedback section.

The preferred embodiments of the present invention will now be described in detail hereinafter with reference to FIGS. 1 to 16. FIG. 1 shows a schematic diagram of a transmission. FIG. 2 shows a schematic diagram of a synchronization mechanism included in the transmission shown in FIG. 1 and of a controller therefor. FIG. 3 shows an illustration of modeling the synchronization mechanism shown in FIG. 2. FIG. 4 shows a control block diagram of the controller shown in FIG. 2. FIG. 5 shows a graph illustrating a behavior of a sliding mode controller shown in FIG. 4. FIG. 6 shows a graph illustrating an effect of changing a compliance parameter. FIG. 7 shows a graph illustrating conditions for setting a reaching law gain and an adaptation law gain. FIG. 8 shows a control block diagram of a controller with an additional current feedback section. FIG. 9 shows a graph illustrating a switching timing for a control process. FIG. 10 shows a schematic diagram of a wavelet transform filter. FIG. 11 shows an illustration of decimation in the wavelet transform filter. FIG. 12 shows a diagram illustrating a table for setting a position of a coupling sleeve and a compliance parameter. FIGS. 13 and 14 show a flowchart of operating the controller. FIG. 15 shows a control block diagram of another example of a controller with an additional current feedback section. FIG. 16 shows a control block diagram of still another example of a controller with an additional current feedback section.

Referring to FIG. 1, there is shown a transmission 80 mounted on a vehicle to transmit an output of an engine 81 via a clutch 82 and a coupling gear 90. The coupling gear 90 engages with a gear 91 of a differential 93, by which the output of the engine 81 is transmitted to a drive wheel 94 via a drive shaft 92.

The transmission 80 is controlled in its operation by a controller 1 (corresponding to a controller for a transmission of the present invention), which is an electronic unit formed by a microcomputer, a memory, and the like. The controller 1 controls a gearshift operation of the transmission 80 by driving a select motor 12, a shift motor 13 (corresponding to a shift actuator of the present invention), and a clutch actuator 16 according to conditions of an accelerator pedal 95, a fuel supply control unit 96, a change lever 97, a clutch pedal 98, and a brake pedal 99.

The transmission 80 has an input shaft 5, an output shaft 4, the first to sixth forward gear pairs 7a to 7f and 9a to 9f, a backward gear shaft 84, and a backward gear train 83, 85, and 86. In this regard, the input shaft 5, the output shaft 4, and the backward gear shaft 84 are arranged in parallel with each other.

The first to sixth forward gear pairs 7a to 7f and 9a to 9f have settings of gear ratio different from each other. The first forward gear 7a on the input side and the second forward gear 7b on the input side are arranged integrally with the input shaft 5, while the corresponding first forward gear 9a on the output side and second forward gear 9b on the output side are formed of idle gears freely rotatable with respect to the output shaft 4. A first/second gear synchronization mechanism 2a performs a switching operation between a state of the first forward gear 9a on the output side and the second forward gear 9b on the output side selectively connected to the output shaft 4 (a gearshift established state) and a state of the both gears 9a and 9b disconnected from the output shaft 4 (a neutral state).

The third forward gear 7c on the input side and the fourth forward gear 7d on the input side are formed of idle gears freely rotatable with respect to the input shaft 5, while the corresponding third forward gear 9c on the output side and fourth forward gear 9d on the output side are arranged integrally with the output shaft 4. A third/fourth gear synchronization mechanism 2b performs a switching operation between a state of the third forward gear 7c on the input side and the fourth forward gear 7d on the input side selectively connected to the input shaft 5 (a gearshift established state) and a state of the both gears 7c and 7d disconnected from the input shaft 5 (a neutral state).

Likewise, the fifth forward gear 7e on the input side and the sixth forward gear 7f on the input side are formed of idle gears freely rotatable with respect to the input shaft 5, while the corresponding fifth forward gear 9e on the output side and six forward gear 9f on the output side are arranged integrally with the output shaft 4. A fifth/sixth gear synchronization mechanism 2c performs a switching operation between a state of the fifth forward gear 7e on the input side and the sixth forward gear 7f on the input side selectively connected to the input shaft 5 (a gearshift established state) and a state of the both gears 7e and 7f disconnected from the input shaft 5 (a neutral state).

Moreover, the backward gear train 83, 85, and 86 is formed of a first backward gear 85 attached to the backward gear shaft 84, a second backward gear 83 arranged integrally with the input shaft 5, and a third backward gear 86 integral with the first/second gear synchronization mechanism 2a of the output shaft 4. The first backward gear 85 is splined to the backward gear shaft 84 for attachment. Thereby, the first backward gear 85 rotates integrally with the backward gear shaft 84 and is freely slidable in an axial direction of the backward gear shaft 84 between a position where it engages with both of the second backward gear 83 and the third backward gear 86 and a position where it is released from the engagement with them (a neutral position).

Moreover, the synchronization mechanisms 2a, 2b, and 2c and the first backward gear 85 are connected to shift forks 10a, 10b, 10c, and 10d, respectively, with a shift piece (not shown) disposed at an end of each of the shift forks being selectively engaged with a shift arm 11. The shift arm 11 rotates by means of the select motor 12. The shift forks are arranged substantially linearly in a line in a direction of arc (a direction of a select operation) in which the shift arm 11 rotates. The shift arm 11 is selectively located in a position where it engages with each shift piece.

Moreover, the shift arm 11 moves in an axial direction (a direction of a shift operation) parallel to the input shaft 5 by means of the shift motor 13 with being engaged with one of the shift pieces. The shift arm 11 is then positioned in the neutral position and in gearshift established positions (shift positions).

Subsequently, referring to FIG. 2, there is shown a configuration of the synchronization mechanism 2b shown in FIG. 1. The configuration of the synchronization mechanism 2c is the same as the synchronization mechanism 2b. While the synchronization mechanism 2a differs from the synchronization mechanisms 2b and 2c in that it is provided on the output shaft 4, they have the same basic configuration and operations.

The synchronization mechanism 2b includes a coupling sleeve 6 rotating integrally with the input shaft 5, a synchronizer ring 8a arranged freely rotatably on the input shaft 5 and movably in the axial direction of the input shaft 5 between the coupling sleeve 6 and the third forward gear 7c on the input side, a synchronizer ring 8b arranged freely rotatably on the input shaft 5 and movably in the axial direction of the input shaft 5 between the coupling sleeve 6 and the fourth forward gear 7d on the input side, and a shift fork 10b connected to the coupling sleeve 6.

The shift fork 10b moves in response to an actuation of the shift motor 13 (shift operation). With the shift arm 11 (see FIG. 1) engaged with a shift piece (not shown) of the shift fork 10b by the select operation, the shift operation displaces the coupling sleeve 6 from the neutral position toward the third forward gear 7c on the input side (when the third gear position is selected) or toward the fourth forward gear 7d on the input side (when the fourth gear position is selected).

Both ends of the coupling sleeve 6 each have a hollow structure, with splines 32a and 32b formed in the inner circumferential surface of the hollow sections. Moreover, a spline 33a engageable with the spline 32a of the coupling sleeve 6 is formed on the outer circumferential surface of the synchronizer ring 8a. Also a spline 34a engageable with the spline 32a of the coupling sleeve 6 is formed on the outer circumferential surface of a portion opposed to the synchronizer ring 8a of the third forward gear 7c on the input side.

Likewise, a spline 33b engageable with the spline 32b of the coupling sleeve 6 is formed on the outer circumferential surface of the synchronizer ring 8b. Also a spline 34b engageable with the spline 32b of the coupling sleeve 6 is formed on the outer circumferential surface of a portion opposed to the synchronizer ring 8b of the fourth forward gear 7d on the input side.

If the coupling sleeve 6 rotating with the input shaft 5 is then moved toward the third forward gear 7c on the input side by means of the shift fork 10b, the coupling sleeve 6 comes in contact with the synchronizer ring 8a and further the synchronizer ring 8a also comes in contact with the third forward gear 7c on the input side. At this point, a frictional force generated by the contact causes synchronization in the number of revolutions between the coupling sleeve 6 and the third forward gear 7c on the input side via the synchronizer ring 8a.

In this manner, if the coupling sleeve 6 is further moved toward the third forward gear 7c on the input side with the number of revolutions of the coupling sleeve 6 synchronized with that of the third forward gear 7c on the input side, the spline 32a formed in the coupling sleeve 6 passes through the spline 33a formed in the synchronizer ring 8a and then engages with the spline 34a formed in the third forward gear 7c on the input side. This provides a state in which power is transmitted between the input shaft 5 and the output shaft 4 (gearshift established state).

Similarly, if the coupling sleeve 6 rotating with the input shaft 5 is moved toward the fourth forward gear 7d on the input side by means of the shift fork 10b, the number of revolutions of the coupling sleeve 6 synchronizes with that of the fourth forward gear 7d on the input side via the synchronizer ring 8b. The spline 32b formed in the coupling sleeve 6 then passes through the spline 33b formed in the synchronizer ring 8b and engages with the spline 34b formed in the fourth forward gear 7d on the input side.

The shift motor 13 is actuated by applying a voltage Vin (corresponding to a control input to a shift actuator of the present invention) output from the controller 1, and a revolution detection signal Es of the shift motor 13 detected by a revolution sensor 15 is input to the controller 1. An operation of the controller 1 will be described hereinafter by giving an example of a shift operation for establishing the third gear position by moving the coupling sleeve 6 toward the third forward gear 7c on the input side (hereinafter, referred to as an idle gear 7c).

The controller 1 comprises a current detecting section 20 for detecting electric current Im running through an armature of the shift motor 13 (hereinafter, referred to as an armature current), an actual position grasping section 21 (corresponding to actual position grasping means of the present invention) for grasping an actual position Psc of the coupling sleeve 6 on the basis of the revolution detection signal Es from the revolution sensor 15 and the like, a target position setting section 22 for setting a target position Psc_cmd of the coupling sleeve 6 in a process of moving the coupling sleeve 6 to engage it with the idle gear 7c via the synchronizer ring 8a, a target current setting section 23 for setting target current (Im_cmd) having a target value of the electric current running through the shift motor 13, and a voltage determination section 24 (including functions of shift position control means and gear position malfunction detecting means of the present invention) for determining the voltage Vin to be applied to the shift motor 13.

The actual position grasping section 21 regards the behavior of the coupling sleeve 6 from when the coupling sleeve 6 has started to move until the coupling sleeve 6 engages with the idle gear 7c via the synchronizer ring 8a with the synchronization between the number of revolutions of the coupling sleeve 6 and that of the idle gear 7c through a contact with the synchronizer ring 8a as a collision between an inertial object and an elastic object and modeling the same and grasps an actual position of the coupling sleeve 6 on the basis of the model.

Referring to FIG. 3, there is shown the model. The actual position grasping section 21 grasps the position of the coupling sleeve 6, considering the coupling sleeve 6 to be an inertial object 30 having an equivalent inertia Jm including the shift motor 13 and the shift fork 10b (see FIG. 2) and considering the synchronizer ring 8a (see FIG. 2) to be an elastic object 31 having an equivalent inertia Ms and a spring modulus Ks. In FIG. 3, a symbol Tm indicates an output torque of the shift motor 13 and Psc_def indicates a standby position of the synchronizer ring 8a (see FIG. 2). The following describes a procedure for calculating a model formula representing the model shown in FIG. 3.

The description begins with a derivation of a model formula of a continuous time system before the inertial object 30 contacts the elastic object 31 (before the coupling sleeve 6 contacts the synchronizer ring 8a).

An equation of motion of the shift motor 13 shown in FIG. 1 is expressed by the following equation (1):

[Eq. 1]

$$Jm \cdot \dot{\omega} = Tm \quad (1)$$

where Jm is the equivalent inertia of the coupling sleeve 6 including the shift motor 13 and the shift fork 10b, ω is a speed of revolution (detected by the revolution sensor 15) of the shift motor 13, and Tm is an output torque of the shift motor 13.

Furthermore, a relation between the output torque Tm of the shift motor 13 and the armature current Im of the shift motor 13 is expressed by the following equation (2) and a relation between a voltage Vm generated in the armature of the shift motor 13 (hereinafter, referred to as an armature voltage) and electrical resistance Rm of the armature (hereinafter, referred to as an armature resistance) is expressed by the following equation (3):

[Eq. 2]

$$Tm = Km \cdot Im \quad (2)$$

where Im is the armature current of the shift motor 13 and Km is a torque conversion factor.

[Eq. 3]

$$Vm = Rm \cdot Im \quad (3)$$

where Vm is the armature voltage of the shift motor 13 and Rm is the armature resistance of the shift motor 13.

Therefore, by applying the relations of the aforementioned equation (2) and equation (3) to the equation (1), we have the following equation (4):

[Eq. 4]

$$Vm = \frac{Jm \cdot Rm}{Km} \dot{\omega} \quad (4)$$

Furthermore, a relation between the applied voltage Vin to the shift motor 13 and a back-electromotive force generated in the shift motor 13 is expressed by the following equation (5):

[Eq. 5]

$$Vin = Km' \cdot \omega + Vm \quad (5)$$

where Vin is the applied voltage to the shift motor 13 and Km' is the back-electromotive force constant.

Then, by applying the relation of the equation (5) to the aforementioned equation (4), we have the following equation (6):

[Eq. 6]

$$Vin = Km' \cdot \omega + \frac{Jm \cdot Rm}{Km} \dot{\omega} \quad (6)$$

Still further, a relation between the speed of revolution ω and a rotation angle θ of the shift motor 13 and the position Psc of the inertial object 30 is expressed by the following equation (7) and equation (8):

[Eq. 7]

$$\theta = \int_0^t \omega \, dt \quad (7)$$

[Eq. 8]

$$Psc = Rsc \cdot \theta \quad (8)$$

where ω is the speed of revolution of the shift motor 13, θ is the rotation angle of the shift motor 13, t is an elapsed time since the shift motor 13 has started the operation, and Rsc is a lever ratio and a gear ratio between the rotation angle θ of the shift motor 13 and the inertial object 30.

Therefore, we have the following equations (9), (10), and (11) from the aforementioned equations (7) and (8):

[Eq. 9]

$$Psc = \int_0^t Rsc \cdot \omega \, dt \quad (9)$$

[Eq. 10]

$$\dot{Psc} = \dot{Rsc} \cdot \theta + Rsc \cdot \dot{\theta} \quad (10)$$

$$= Rsc \cdot \dot{\theta}$$

$$= Rsc \cdot \omega$$

$$\because \dot{Rsc} = 0$$

[Eq. 11]

$$\ddot{Psc} = \dot{Rsc} \cdot \omega + Rsc \cdot \dot{\omega} \quad (11)$$

$$= Rsc \cdot \dot{\omega}$$

Then, by substituting the equations (9), (10), and (11) for the aforementioned equation (6), we have the following equation (12):

[Eq. 12]

$$\ddot{Psc} = \frac{-Km' Km}{Jm \, Rm} \dot{Psc} + \frac{Km \cdot Rsc}{Jm \cdot Rm} Vin \quad (12)$$

A necessary element for controlling the synchronization mechanism 2b besides the position Psc of the coupling sleeve 6 is armature current Im for detecting a load on the shift motor 13. Therefore, we have the following equation (13) as a model formula of the armature current Im from the aforementioned equations (4) and (11):

[Eq. 13]

$$Im = \frac{Vm}{Rm} = \frac{Jm}{Km} \dot{\omega} = \frac{Jm}{Km \cdot Rsc} \ddot{Psc} \quad (13)$$

where Im is the armature current of the shift motor 13.

Accordingly, a one-input and two-output model with an input of the applied voltage Vin to the shift motor 13 and outputs of the actual position Psc of the coupling sleeve 6 and the armature current Im of the shift motor 13 can be expressed by the foregoing equations (12) and (13).

The following describes how to derive a model formula of the continuous time system when the inertial object 30 contacts the elastic object 31 and comes to receive a reaction force from the elastic object 31 (when the coupling sleeve 6 contacts the synchronizer ring 8 and comes to receive a reaction force from the synchronizer ring 8).

The equation of motion of the inertial object 31 in FIG. 3 is expressed by the following equation (14):

[Eq. 14]

$$Ms \, \ddot{Psc} = -Ksc(Psc - Psc\_def) + Fsc \quad (14)$$

where Ms is the equivalent inertia of the elastic object 31, Psc_def is the standby position of the elastic object 31, Ksc is the spring modulus of the elastic object 31, and Fsc is a force that the elastic object 31 receives from the inertial object 30 (a reaction force applied to the inertia object 30 by the elastic object 31).

A rearrangement of the above equation (14) focusing on the reaction force (Fsc) provides the following equation (15):

[Eq. 15]

$$Fsc = Ms \cdot \ddot{Psc} + Ksc(Psc - Psc\_def) \quad (15)$$

In this regard, the reaction force (Fsc) is to be applied to the inertial object 30 by the elastic object 31 and an equation of motion of the inertial object 30 under the reaction force (Fsc) is expressed by the following equation (16):

[Eq. 16]

$$Jm \cdot \dot{\omega} = Tm - Rsc \cdot Fsc \quad (16)$$

$$= Km \cdot Im - Rsc \cdot Fsc$$

$$= Km \cdot Vm / Rm - Rsc \cdot Fsc$$

The following equation (17) is achieved by transforming the equation (16). Considering the back-electromotive force of the shift motor 13, a relation between the applied voltage Vin to the shift motor 13 and the armature voltage Vm is expressed by the following equation (18):

[Eq. 17]

$$Vm = \frac{Jm \cdot Rm}{Km} \dot{\omega} + \frac{Rsc \cdot Rm}{Km} Fsc \qquad (17)$$

[Eq. 18]

$$\begin{aligned} Vin &= Km' \cdot \omega + Vm \\ &= Km' \cdot \omega + \frac{Jm \cdot Rm}{Km} \dot{\omega} + \frac{Rsc \cdot Rm}{Km} Fsc \end{aligned} \qquad (18)$$

By substituting the aforementioned equations (10) and (11) for the equation (18), we have the following equation (19) and then the following equation (20) by rearranging the equation (19):

[Eq. 19]

$$Vin = Km' \cdot \dot{P}sc/Rsc + \frac{Jm \cdot Rm}{Km} \ddot{P}sc/Rsc + \frac{Rsc \cdot Rm}{Km} Fsc \qquad (19)$$

[Eq. 20]

$$\ddot{P}sc = \frac{-Km \cdot Km'}{Jm \cdot Rm} \dot{P}sc + \frac{Km \cdot Rsc}{Jm \cdot Rm} Vin - \frac{Rsc^2 \cdot Rm}{Jm \cdot Rm} Fsc \qquad (20)$$

Furthermore, by substituting the equation (11) for the aforementioned equation (16) regarding the armature current Im of the shift motor 13, we have the following equation (21):

[Eq. 21]

$$Im = \frac{Jm}{Km \cdot Rsc} \ddot{P}sc + \frac{Rsc}{Km} Fsc \qquad (21)$$

Accordingly, the model with the reaction force from the elastic object 31 considered can be expressed by the foregoing equations (20) and (21).

Subsequently, a model formula of a discrete time system is derived on the basis of the model formula of the continuous time system expressed by the foregoing equations (20) and (21).

First, if state variables (x1, x2) of the continuous time system model are set as shown in the following equation (22), the continuous system model can be expressed by the following equation (23) based on the aforementioned equation (20):

[Eq. 22]

$$\begin{cases} x_1 = Psc \\ x_2 = \frac{dx_1}{dt} = \dot{P}sc, \quad \frac{dx_2}{dt} = \ddot{P}sc \end{cases} \qquad (22)$$

[Eq. 23]

$$\begin{cases} \dfrac{dx_1}{dt} = x_2 \\ \dfrac{dx_2}{dt} = \dfrac{-Km \cdot Km'}{Jm \cdot Rm} x_2 + \dfrac{Km \cdot Rsc}{Jm \cdot Rm} Vin - \dfrac{Rsc^2}{Jm} Fsc \end{cases} \qquad (23)$$

Assuming that T is a sampling period of the controller 1, the above equation (23) is expressed by the following equation (24) by the Euler approximation and the following equations (25) and (26) are obtained by transforming the equation (24):

[Eq. 24]

$$\begin{cases} \dfrac{x_1(t) - x_1(t-T)}{T} = x_2(t) \\ \dfrac{x_2(t) - x_1(t-T)}{T} = \dfrac{-Km \cdot Km'}{Jm \cdot Rm} x_2(t-T) + \\ \qquad \qquad \dfrac{Km \cdot Rsc}{Jm \cdot Rm} Vin(t-T) - \dfrac{Rsc^2}{Jm} Fsc \end{cases} \qquad (24)$$

where t is a sampling point and T is a sampling period.

[Eq. 25]

$$x_1(t) = x_1(t-T) + T \cdot x_2(t) \qquad (25)$$

[Eq. 26]

$$x_2(t) = \qquad (26)$$
$$\left(1 - \frac{-Km \cdot Km'}{Jm \cdot Rm}\right) x_2(t-T) + \frac{Km \cdot Rsc}{Jm \cdot Rm} T \cdot Vin(t-T) - \frac{Rsc^2}{Jm} T \cdot Fsc$$

Furthermore, $x_2(t-T)$ in the foregoing equation (26) can be expressed by the following equation (27) by the Euler approximation:

[Eq. 27]

$$x_2(t - 2T) = \frac{x_1(t-T) - x_1(t-2T)}{T} \qquad (27)$$

Then, the equations (26) and (27) are substituted for the equation (25) and rearranged, whereby we have the following equation (28):

[Eq. 28]

$$x_1(k) = \left(2 - \frac{Km \cdot Km'}{Jm \cdot Rm} T\right) x_1(t-T) - \left(1 - \frac{Km \cdot Km'}{Jm \cdot Rm} T\right) x_1(t-2T) + \qquad (28)$$
$$\frac{Km \cdot Rsc}{Jm \cdot Rm} T^2 \cdot Vin(t-T) - \frac{Rsc^2}{Jm} T^2 \cdot Fsc$$

A rearrangement of the equation (28) with t=kT provides the following equation (29) and thus an equation (30) is obtained:

[Eq. 29]

$$x_1(k) = \left(2 - \frac{Km \cdot Km'}{Jm \cdot Rm}T\right)x_1(k-1) - \left(1 - \frac{Km \cdot Km'}{Jm \cdot Rm}T\right)x_1(k-2) + \frac{Km \cdot Rsc}{Jm \cdot Rm}T^2 \cdot Vin(k-1) - \frac{Rsc^2}{Jm}T^2 \cdot Fsc \qquad (29)$$

[Eq. 30]

$$x_1(k+1) = \left(2 - \frac{Km \cdot Km'}{Jm \cdot Rm}T\right)x_1(k) - \left(1 - \frac{Km \cdot Km'}{Jm \cdot Rm}T\right)x_1(k-1) + \frac{Km \cdot Rsc}{Jm \cdot Rm}T^2 \cdot Vin(k) - \frac{Rsc^2}{Jm}T^2 \cdot Fsc \qquad (30)$$

Thereafter, the coefficients in the equation (30) are replaced with those as shown in the following equation (31), by which the equation (30) can be expressed by the following equation (32):

[Eq. 31]

$$\begin{cases} x_1 = Psc \\ a1 = 2 - \frac{Km \cdot Km'}{Jm \cdot Rm}T, \quad a2 = -1 + \frac{Km \cdot Km'}{Jm \cdot Rm}T \\ b1 = \frac{Km \cdot Rsc}{Jm \cdot Rm}T^2 \\ d = \frac{Rsc^2}{Jm}T^2 \cdot Fsc \end{cases} \qquad (31)$$

[Eq. 32]

$$Psc(k+1) = a1 \cdot Psc(k) + a2 \cdot Psc(k-1) + b1 \cdot Vin(k) + d \qquad (32)$$

Accordingly, the controller 1 is designed in a construction shown in FIG. 4 on the basis of a model represented by the following equation (33) with a disturbance term d set to 0 in the discrete time system model expressed by the equation (32). The construction of the controller 1 shown in FIG. 4 will be described hereinafter.

[Eq. 33]

$$Psc(k+1) = a1 \cdot Psc(k) + a2 \cdot PSC(k-1) + b1 \cdot Vin(k) \qquad (33)$$

First, the description is made for a design procedure for a sliding mode controller 40 for: (1) causing the actual position of the inertial object 30 to follow the target position Psc_cmd rapidly; and (2) achieving a compliance (rubber-like elasticity) at the contact between the inertial object 30 and the elastic object 31 for the model expressed by the above equation (33).

The sliding mode controller 40 controls a behavior of the inertial object 30 by using the sliding mode control, which is an example of a response specification control. On the basis of the aforementioned equation (33), the sliding mode controller 40 receives inputs of the actual position Psc of the inertial object 30 calculated by the actual position grasping section 21, the target position Psc_cmd of the inertial object 30 set by the target position setting section 22, and a compliance parameter VPOLE (corresponding to an operational coefficient of the present invention) described later.

Thereafter, a difference Esc between the actual position Psc and the target position Psc_cmd of the inertial object 30 is defined as shown in the following equation (34), by which a switching function σ (corresponding to a linear function of the present invention) for specifying the degree of effect of a convergence behavior of the difference Esc or a disturbance given to the difference Esc is defined as shown in the following equation (35) due to two state variables Psc(k) and Psc(k−1) of the equation (34).

[Eq. 34]

$$Esc(k) = Psc(k) - Psc\_cmd(k) \qquad (34)$$

[Eq. 35]

$$\sigma(k) = Psc(k) + VPOLE \cdot Esc(k-1) \qquad (35)$$

where VPOLE is a compliance parameter (switching function setting parameter).

The sliding mode controller 40 determines a control input so that the switching function σ satisfies σ(k)=0. The equation σ(k)=0 can be transformed into the following equation (36) from the above equation (35):

[Eq. 36]

$$Esc(k) = -VPOLE \cdot Esc(k-1) \qquad (36)$$

In this regard, the equation (36) represents a first-order lag system with no input and therefore the sliding mode controller 40 executes a control for converging a response of a control system to the first-order lag system in the equation (36).

Therefore, from a phase plane set with Esc(k) arranged along the ordinate and Esc(k−1) arranged along the abscissa as shown in FIG. 5(a), it is apparent that the equation (36) represents a liner function on the phase plane. Furthermore, the equation (36) is the first-order lag system with no input. Therefore, through stabilization of the first-order lag system by setting the compliance parameter VPOLE (corresponding to an operational coefficient of the present invention) within the range of the following equation (37), the difference (Esc) always converges to a value of 0 with the lapse of time (k→∞) in the system.

[Eq. 37]

$$-1 < VPOLE < 1 \qquad (37)$$

Therefore, if a state quantity of a difference (Esc(k), Esc(k−1), which corresponds to a state quantity of the present invention) converges onto the switching function (σ(k)=0, which corresponds to a switching function of the present invention) on the phase plane shown in FIG. 5(a), the state quantity is bound by the first-order lag system with no input and therefore automatically converges to the origin {(Esc(k), Esc(k−1))=(0, 0)} on the phase plane over time.

Therefore, the sliding mode controller 40 utilizes the behavior of the state quantity (Esc(k), Esc(k−1)) of the difference on the switching function to determine the control input Vin so as to achieve σ=0 in the equation (35) as shown in FIG. 5(a), thereby constraining the state quantity to remain onto the switching function (σ(k)=0) and converging the state quantity to the origin of the phase plane without influence of a disturbance or a modeling error.

A behavior of asymptotic approach of the state quantity of the difference to the switching function (the process from P1 to P2 in FIG. 5(a)) is referred to as "reaching mode," and a behavior of the state quantity automatically converging to the origin on the switching function (the process from P2 to P0 in FIG. 5(a)) is referred to as "sliding mode."

If the compliance parameter (VPOLE) in the equation (36) is set to a positive value (0<VPOLE<1), the first-order lag system expressed by the equation (36) becomes an oscillating-stability system, which is not preferable for the control of converging the difference (Esc). Therefore, the compliance parameter (VPOLE) is determined within a range of −1 to 0 (−1<VPOLE<0) to set the convergence response of the difference (Esc) as shown in FIG. 5(b). In FIG. 5(b), symbols a, b, and c designate processes of the difference Esc for settings −1, −0.8, and −0.5 of the compliance parameter (VPOLE). In this condition, if VPOLE is set to −1, the difference Esc does not converge to a value of 0, but remains at a fixed value.

Subsequently, dynamic characteristics of the equation (36) or response specification characteristics of the sliding mode controller 40 will be described below. Referring to FIG. 6, there is shown a graph illustrating responses of the control system obtained by giving a step disturbance D under the conditions σ=0 and Esc=0 with the compliance parameters (VPOLE) set to −0.5, −0.8, −0.99, and −1.0, taking the difference Esc, the switching function σ, and the disturbance D from top in this order along the ordinate and taking time k along the abscissa.

As apparent from FIG. 6, as an absolute value of the compliance parameter VPOLE becomes smaller, the effect of the disturbance D on the difference Esc decreases. Conversely, as the absolute value of the compliance parameter VPOLE increases to be close to 1, the difference Esc permitted by the sliding mode controller increases. In this condition, it is understood that an allowance for the disturbance D (the capabilities of controlling the disturbance) can be specified by using the compliance parameter VPOLE since the behavior of the switching function value σ is identical independently of the compliance parameter VPOLE.

When the inertial object 30 contacts the elastic object 31 as shown in FIG. 3, it is necessary to press the inertial object 30 against the elastic object 31 while preventing the situations where: (1) the inertial object 30 is bounced back by the elastic object 31; and (2) the inertial object 30 is pressed into the elastic object 31 due to an excess force of a collision.

Therefore, focusing on the aforementioned characteristics, it is understood that it is effective to generate compliance caused by an action of the shift motor 13 at the time of contact between the inertial object 30 and the elastic object 31 by increasing an allowance value of the difference Esc for a disturbance (decreasing the disturbance-control capabilities) with the compliance parameter VPOLE set close to −1 when the inertial object 30 contacts the elastic object 31.

This makes it possible to achieve the effects of constraining an occurrence of an excess impact at the time of contact between the inertial object 30 and the elastic object 31 and enabling the inertial object 30 to be pressed against the elastic object 31 without applying an excess force to the elastic object 31.

Considering these effects with applying them to an actual synchronization mechanism shown in FIG. 2, it is understood that the impact can be reduced when the coupling sleeve 6 contacts the synchronizer ring 8a. In addition, it is possible to press the coupling sleeve 6 against the synchronizer ring 8a without applying an excess force to the synchronizer ring 8a to achieve their synchronization in the number of revolutions and then to engage the coupling sleeve 6 with the idle gear 7c.

Subsequently, the control input Vin output from the sliding mode controller 40 is set by a total sum of three control inputs as shown in the following equation (38):

[Eq. 38]

$$Vin(k)=Usl(k)=Ueq(k)+Urch(k)+Uadp(k) \qquad (38)$$

where Vin(k) is an applied voltage to the shift motor 13 in the kth sampling period, Ueq(k) is an equivalent control input in the kth sampling period, Urch(k) is a reaching law input in the kth control cycle, and Uadp(k) is an adaptation law input in the kth sampling period.

The equivalent control input is for use in constraining the state quantity (Esc(k), Esc(k−1)) of the difference to remain on the switching function (σ=0). The reaching law input is for use in causing the state quantity to converge onto the switching function. The adaptation law input is for use in absorbing a modeling error or a disturbance to converge the state quantity onto the switching function.

Hereinafter, a description will be given for a method of setting the equivalent control input Ueq(k), the reaching law input Urch(k), and the adaptation law input Uadp(k).

First, the equivalent control input Ueq has a function of holding the state quantity of the difference at the same place, strictly in an arbitrary place on the phase plane. Therefore, the equivalent control input Ueq is calculated as an applied voltage Vin satisfying the following equation (39):

[Eq. 39]

$$\sigma(k+1)=\sigma(k) \qquad (39)$$

By substituting the aforementioned equation (35) and equation (34) for the equation (39), we have the following equation (40):

[Eq. 40]

$$Psc(k+1)-Psc\_cmd(k+1)+VPOLE\ \{Psc(k)-Psc\_cmd(k)\}=Psc(k)-Psc\_cmd(k)+VPOLE\ \{Psc(k-1)-Psc\_cmd(k-1)\} \qquad (40)$$

By substituting the aforementioned equation (33) for the equation (40) for rearrangement, we have the following equation (41) regarding the equivalent control input Ueq:

[Eq. 41]

$$Ueq(k) = Vin(k) \qquad (41)$$

$$= \frac{1}{b1}\{(1 - VPOLE - a1)Psc(k) +$$
$$(VPOLE - a2)Psc(k-1)\} + Psc\_cmd(k+1) +$$
$$(VPOLE - 1)Psc\_cmd(k) - VPOLE \cdot Psc\_cmd(k-1)$$

The reaching law input Urch is then calculated by the following equation (42):

[Eq. 42]

$$Urch(k) = \frac{-F}{b1}(|\sigma(k)| + \Delta)\operatorname{sign}(\sigma(k)) \qquad (42)$$

where F is a reaching law gain and Δ is a switching amplitude (a non-linear absorption parameter for mechanical backlash or looseness and the like).

Assuming the switching amplitude Δ is a value of 0 (Δ=0), the equation (42) is expressed by the following equation (43):

[Eq. 43]

$$Urch(k) = \frac{-F}{b1}\sigma(k) \qquad (43)$$

Furthermore, the adaptation law input Uadp is calculated by the following equation (44):

[Eq. 44]

$$Uadp(k) = \frac{-G}{b1} \cdot \sum_{i=0}^{k} \sigma(i) \qquad (44)$$

where G is an adaptation law gain.

In this regard, a control input Usl(k) is obtained by substituting the equivalent control input Ueq(k) in the equation (41), the reaching law input Urch(k) in the equation (43), and the adaptation law input Uadp(k) in the equation (44) for the equation (38). By substituting the control input Usl(k) for the equation (33) as the applied voltage Vin to the shift motor 13, we have the following equation (45):

[Eq. 45]

$$\begin{aligned}
Psc(k+1) &= a1\, Psc(k) + a2\, Psc(k-1) + b1\, Vin(k) \qquad (45)\\
&= a1\, Psc(k) + a2\, Psc(k-1) + \\
&\quad b1(Ueq(k) + Urch(k) + Uadp(k)) \\
&= a1\, Psc(k) + a2\, Psc(k-1) + \\
&\quad (1 - VPOLE - a1)\, Psc(k) + \\
&\quad (VPOLE - a2)\, Psc(k-1) + Psc\_cmd(k+1) + \\
&\quad (VPOLE - 1)\, Psc\_cmd(k) - \\
&\quad VPOLE \cdot Psc\_cmd(k-1) - F\sigma(k) - G\sum_{i=0}^{k}\sigma(i)
\end{aligned}$$

Then, the equation (34) and the equation (35) are applied to the equation (45) for rearrangement regarding σ, whereby we have the following equation (46):

[Eq. 46]

$$\sigma(k+1) = (1 - F)\sigma(k) - G\sum_{i=0}^{k}\sigma(i) \qquad (46)$$

In this regard, the reaching law input Urch(k) and the adaptation law input Uadp(k) have a role of moving the difference state quantity (Esc(k), Esc(k−1)) onto the switching function (σ=0), in other words, stabilizing the equation (46) (σ→0). Therefore, it is necessary to determine the reaching law gain F and the adaptation law gain G so that the equation (46) is stabilized.

Therefore, a Z transform of the above equation (46) provides the following equation (47) and the following equation (48) is obtained by transforming the equation (47):

[Eq. 47]

$$Z \cdot \Sigma = (1 - F)\Sigma - G\frac{T}{Z-1}\Sigma \qquad (47)$$

[Eq. 48]

$$Z^2 \cdot \Sigma + Z(F-2)\Sigma + (GT+1-F)\Sigma = 0 \qquad (48)$$

In this case, the condition of stabilizing the equation (48) is a combination of coefficients of the second term and the third term (F−2, GT+1−F) in the left side within the triangular area in FIG. 7. Therefore, it is simply necessary to determine the F and G values so that the combination of these coefficients is within the triangular area.

The sliding mode controller 40 then determines the reaching law input Urch(k) and the adaptation law input Uadp(k) from the equation (43) and the equation (44) from the F and G values determined as stated above, respectively, and determines the equivalent control input Ueq(k) from the equation (41) to determine the control input Vin to the shift motor 13 from the equation (38).

Subsequently, referring to FIG. 2, the coupling sleeve 6 need be pressed against the synchronizer ring 8 with a constant pressure to synchronize the number of revolutions of the coupling sleeve 6 and that of the idle gear 7c in the actual synchronization mechanism. Therefore, in the model shown in FIG. 3, there is a need for a construction of making a control for applying the constant pressing force from the inertial object 30 to the elastic object 31 after the inertial object 30 contacts the elastic object 31.

In this regard, the armature current Im of the shift motor 13 with the inertial object 30 in contact with the elastic object 31 is expressed by the aforementioned equation (21). Since the acceleration of the inertial object 30 is thought of as zero (the second-order differential of Psc is zero) during revolution synchronization, the aforementioned equation (21) is expressed by the following equation (49):

[Eq. 49]

$$Im = \frac{Rsc}{Km}Fsc \qquad (49)$$

Furthermore, the constant pressing force is a reaction force of the force Fsc applied from the elastic object 31 to the inertial object 30. Therefore, to keep the pressing force constant, a relation of the following equation (50) only need be satisfied:

[Eq. 50]

$$Im = Im\_cmd \qquad (50)$$

where Im_cmd is a target current value.

In addition, the time discretization of the equation (50) provides the following equation (51) for calculating a difference Eim between the actual armature current Im and the target current value Im_cmd.

[Eq. 51]

$$Eim(k) = Im(k) - Im\_cmd = 0 \qquad (51)$$

As apparent from the equation (20) and the equation (21), the synchronization mechanism 2 is expressed as a one-input and two-output model with an input of the voltage Vin applied to the shift motor 13 and outputs of the position Psc of the inertial object 30 and the armature current Im of the shift motor 13.

Until the inertial object 30 contacts the elastic object 31, however, it is only necessary to control the position Psc of the inertial object 30. Therefore, the sliding mode controller 40 can present the synchronization mechanism 2 as a one-input and one-output model with an input of the control input Vin to the shift motor 13 and an output of the position Psc of the inertial object 30 to perform the control.

Therefore, in order to carry out a feedback control of the armature current Im of the shift motor 13, it is necessary to change the sliding mode controller 40 from one intended for a model with one input and one output to one intended for a model with one input and two outputs. The change of the sliding mode controller 40, however, causes a discontinuous input Vin, and thus it is hard to stabilize a control state at changing the sliding mode controller 40.

Therefore, the voltage determination section 24 does not change the sliding mode controller 40, but adjusts the compliance parameter VPOLE for setting the compliance of the sliding mode controller 40 by a feedback of the armature current Im of the shift motor 13 to stabilize the pressing force from the inertial object 30 to the elastic object 31 as described below.

First, the feedback control of the armature current Im is exercised by using a simple sliding mode control expressed by the following equations (52) to (57), in consideration of an instant response of the armature current Im to the target current Im_cmd and stability of the armature current Im proportional to the pressing force:

[Eq. 52]
$$E\_Im(k)=Im\_cmd-Im(k) \quad (52)$$

[Eq. 53]
$$\sigma\_Im(k)=E\_Im(k)+POLE\_Im \cdot E\_Im(k-1) \quad (53)$$

[Eq. 54]
$$Urch\_Im(k)=F\_Im \cdot \sigma\_Im(k) \quad (54)$$

[Eq. 55]
$$Uadp\_Im(k) = G\_Im \cdot \sum_{i=0}^{k} \sigma\_Im(i) \quad (55)$$

[Eq. 56]
$$VPOLE\_Im(k)=VPOLE\_bs+Urch\_Im(k)+Uadp\_Im(k) \quad (56)$$

[Eq. 57]
$$VPOLE\_(k)=\text{Limit}(VPOLE\_{Im}(k)) \quad (57)$$

where Limit is a limiting process of −1 to 0, F_Im is a reaching law gain, G_Im is an adaptation law gain, POLE_Im is a switching function setting parameter, VPOLE_bs is a VPOLE reference value, Urch_Im is a reaching law input, and Uadp_Im is an adaptation law input.

A control block diagram of the current feedback system is as shown in FIG. 8. In the control block diagram in FIG. 8, there is shown a dual feedback system having a current feedback section 50a for controlling the armature current Im besides the sliding mode controller 40 intended for controlling a model with one input and one output, instead of using the sliding mode controller intended for controlling a model with one input and two outputs.

The current feedback section 50a is included in the compliance parameter calculating section 41 shown in FIG. 4. A subtractor 51 calculates a current difference E_Im by the aforementioned equation (52). A switching function calculating section 52 calculates a switching function σ_Im by the equation (53). A proportional arithmetic unit 53 calculates a reaching law input Urch_Im by the equation (54). An integrator 55 and an integral multiplier 56 calculate an adaptation law input Uadp_Im by the equation (55).

Furthermore, an adder 57 and an adder 58 calculate a compliance parameter VPOLE_Im reflecting the current feedback by the equation (56) and a limiter 59 performs a limiting process by the equation (57), thereby determining the compliance parameter VPOLE for the sliding mode controller 40.

Subsequently, the compliance parameter calculating section 41 shown in FIG. 4 sets the compliance parameter VPOLE for setting the compliance of the sliding mode controller 40 controlling the operation of the synchronization mechanism 2 (2a, 2b, and 2c) in the following three processes:

Process 1: Target value follow-up control (Control of the position Psc of the inertial object 30 and control of the compliance at the contact between the inertial object 30 and the elastic object 31). Determine the compliance parameter VPOLE according to the position Psc of the inertial object 30.

Process 2: Revolution synchronization control (Control of the pressing force to the elastic object 31). Determine the compliance parameter VPOLE according to the aforementioned feedback of the armature current of the shift motor 13.

Process 3: Static control (Control for halting a forward behavior of the inertial object 30 after the revolution synchronization (after the completion of an engagement between the coupling sleeve 6 and the idle gear 7c in the synchronization mechanism 2)). Keep the compliance parameter VPOLE constant.

The compliance parameter calculating section 41 have to switch the processes stably even if variations or changes occur in the position of switching from the process 1 to the process 2 or in the timing for switching from the process 2 to the process 3 due to mechanical variations or aged deterioration of the synchronization mechanism. The following describes a method of determining the switching timing of the processes.

The upper graph in FIG. 9 shows variations in difference Esc (=Psc−Psc_cmd) between the actual position Psc (d in FIG. 9) and the target position Psc_cmd (e in FIG. 9) of the inertial object 30 at the time of switching between the processes, with the actual position Psc and the target position Psc_cmd of the inertial object 30 arranged along the ordinate and the time Time arranged along the abscissa. As apparent from the graph, the difference Esc varies as follows at switching between the processes:

Switching from the process 1 to the process 2: A contact with the elastic object 31 restrains the motion of the inertial object 30 and causes the actual position Psc to lag behind the target position Psc_cmd, thereby increasing the difference Esc in the negative direction.

Switching from the process 2 to process 3: When the actual position Psc of the inertial object 30 reaches the target position Psc_cmd after the completion of the revolution synchronization between the elastic object 31 and the inertial object 30, the difference Esc decreases in the positive direction.

Therefore, simply the variations in the difference Esc need be detected for switching the processes and then values of the compliance parameter VPOLE (f in FIG. 9) need be set according to the processes as shown in the lower graph of FIG. 9.

The actual synchronization mechanism shown in FIG. 2 to be controlled is liable to have a large mechanical backlash or looseness and friction. Therefore, setting a shorter sampling period of the controller 1 provides higher controllability. If the difference Esc is calculated with the shorter sampling period, however, an SN ratio decreases and thus it becomes hard to detect variations in the difference Esc. Therefore, the Wavelet transform filter 43 (See FIG. 4) in the voltage determination section 24 extracts only low-frequency components of the difference Esc by executing the Wavelet transform on the difference Esc as described later to facilitate a detection of variations in the difference Esc.

A filter with a Wavelet transform 43 (hereinafter, referred to as a Wavelet transform filter) has a configuration shown in FIG. 10(*a*) and performs filtering by carrying out half-band low-pass filter processing and decimation processing by the following equation (58) twice:

[Eq. 58]

$$Gl(\eta) = 0.7071 \times u(\eta) + 0.7071 \times u(\eta-1) \quad (58)$$

where u is input data and η is a time series number of a sampling period.

The half-band low-pass filter 70 in the first stage shown in FIG. 10(*a*) performs processing of the equation (57) for an input value Esc(k) of the current sampling period and an input value Esc(k−1) of the previous sampling period. The half-band law-pass filter 71 in the second stage performs processing of the equation (58) for the current value and the previous value of Esc_wv1(m1) (Esc_wv1(m1) and Esc_wv1(ml−1)) obtained by performing decimation 72 (2↓ in FIG. 10(*a*)) on outputs of the half-band low-pass filter 70 in the first stage.

As shown in FIG. 10(*b*), the half-band low-pass filters 70 and 71 each block a half (Nyquist frequency) or more of frequency components of the sampling frequency and have a low-frequency gain greater than 1, thereby providing effect of amplifying the gain for low-frequency components.

The decimation 72 and 73 (2↓) in FIG. 10(*a*) is thinning processing and the input data u is sampled alternately as shown in FIG. 11(*a*).

The Wavelet transform filter 43 extracts the low-frequency components Esc_wv while amplifying the gain as shown in FIG. 11(*b*) by repeating the processing of the half-band low-pass filters 70 and 71 and the decimation 72 and 73. The graph shown in FIG. 11(*b*) has the ordinate representing the gain and the abscissa representing the frequency.

This removes high-frequency components of the input signal Esc and amplifies the gain for the input signal Esc. Therefore, variations in the low-frequency components of the input signal Esc can be extracted with the S/N ratio improved.

Then, the compliance parameter calculating section 41 switches the processes by using a variation of the Wavelet transform value Esc_wv of the difference Esc, ΔEsc_wv (=Esc_wv(m)−Esc)wv(m−1)), as follows:

Switching from process 1 to process 2: Psc>Psc_def and Esc_wv>X_SCCNT

Switching from process 2 to process 3: Psc>Psc_def and ΔEsc_wv>X_SCDONE

It should be noted here that Psc_vp is a VPOLE variation starting position in the process 1, X_SCCNT is a contact judgment value of Esc_wv, and X_SCDONE is a judgment value for the completion of the revolution synchronization.

A description will be given for a procedure for controlling the operation of the transmission 80 shown in FIG. 1 using the controller 1 having the construction described hereinabove with reference to a flowchart shown in FIGS. 13 and 14. Upon receiving a signal indicating a shift of the transmission from a main controller (not shown) of a vehicle, the controller 1 proceeds from step 1 to step 2.

The controller 1 then sets a motion pattern of the coupling sleeve 6 as a target position Psc_cmd as shown in FIG. 12(*a*) by means of the target position setting section 22 according to the gear selection target value NGEAR_cmd that indicates a gear position selected by the main controller. A relation between the gear selection target value NGEAR_cmd and the selected gear position is as shown in the following table (1):

TABLE 1

(1) Correspondence table between gear selection target value (NGEAR_cmd) and selected gear position

| | NGEAR_cmd | | | | | | |
|---|---|---|---|---|---|---|---|
| | −1 | 1 | 2 | 3 | 4 | 5 | 6 | 0 |
| Selected gear position | Reverse | 1st | 2nd | 3rd | 4th | 5th | 6th | Neutral |

The controller 1 sets the compliance parameter VPOLE variation starting position Psc_vp in the process 1, a standby position Psc_def of the synchronizer ring, and a chamfer position Psc_chmf of an idle gear (9*a*, 9*b*, 7*c*, 7*d*, 7*e*, or 7*f*) of the gear position according to NGEAR_cmd. A balk point where the coupling sleeve 6 and the idle gear contact the synchronizer ring 8 (8*a*, 8*b*) and it begins to produce synchronous friction between the synchronizer ring 8 and the idle gear is slightly close to the chamfer position Psc_chmf relative to the standby position Psc_def of the synchronizer ring 8.

In the subsequent step 3, the controller 1 calculates the difference Esc between the actual position Psc and the target position Psc_cmd of the coupling sleeve 6 calculated by the actual position grasping section 21 using the equation (33). A symbol k in FIG. 13 indicates the kth sampling period and Psc(k) and Psc_cmd(k) indicate the actual position and the target position of the coupling sleeve 6 in the kth sampling period, respectively.

In the next step 4, the controller 1 calculates a Wavelet transform value Esc_wv of the difference Esc by performing the processing with the aforementioned Wavelet transform filter 43. In FIG. 13, Esc_wv(m) indicates a Wavelet transform value calculated based on the difference (Esc(k)) in the kth sampling period as shown in FIG. 10(*a*).

The subsequent step 5 to step 7 are processing for determining a timing for switching between the aforementioned processes (process 1, process 2, and process 3): switching conditions from the process 1 to the process 2 are set in step 5 and step 6 and a switching condition from the process 2 to the process 3 is set in step 7.

First, in step 5 the control branches to step 20 until the actual position Psc(k) of the coupling sleeve 6 passes the standby position Psc_def of the synchronizer ring 8. In step 20, the compliance parameter calculating section 41 sets the compliance parameter VPOLE to a value close to 0 (for example, −0.2) according to the compliance parameter VPOLE setting table shown in FIG. 12(b). The setting table shown in FIG. 12(b) has the ordinate representing the compliance parameter VPOLE and the abscissa representing the actual position Psc of the coupling sleeve 6.

This reduces the compliance of the synchronization mechanism 2 since the coupling sleeve 6 starts to move until it reaches the compliance parameter VPOLE variation starting position Psc_vp, thereby permitting the coupling sleeve 6 to move stably with less effect of disturbance.

On the other hand, the compliance parameter calculating section 41 (see FIG. 4) decreases the compliance parameter VPOLE to a value close to −1 (for example, −0.99) when the coupling sleeve 6 passes the compliance parameter VPOLE variation starting position Psc_vp. Like this, the compliance of the synchronization mechanism 2 is increased by previously decreasing the value of the compliance parameter VPOLE immediately before the coupling sleeve 6 actually contacts the synchronizer ring 8, thereby enabling an absorption of an impact generated when the coupling sleeve 6 contacts the synchronizer ring 8.

Then, if the aforementioned switching condition from the process 1 to the process 2, Esc_wv(m)>X_SCCNT is satisfied, in other words, the Wavelet transform value Esc_wv of the difference Esc between the actual position Psc and the target position Psc_cmd of the coupling sleeve 6 exceeds the contact judgment value X_SCCNT and thereby a contact between the coupling sleeve 6 and the synchronizer ring 8 is detected in the next step 6, the control proceeds to step 7.

In step 7, if the aforementioned switching condition from the process 2 to the process 3, ΔEsc_wv(m)>X_SCDONE is satisfied, in other words, a revolution synchronization is achieved between the coupling sleeve 6 and the synchronizer ring 8 (8a, 8b) and thus the coupling sleeve 6 passes the synchronizer ring 8 and engages with the idle gear, the control proceeds to step 30.

On the other hand, unless ΔEsc_wv(m)>X_SCDONE is satisfied in step 7, the control proceeds to step 8, where the voltage determination section 24 determines whether the actual position Psc of the coupling sleeve 6 has reached the malfunction judgment position (Psc_chmf-α) set within a range from the balk point to just before the chamfer position Psc_chmf.

In this regard, if the actual position Psc of the coupling sleeve 6 has reached the malfunction judgment position (Psc>Psc_chmf-α), it can be determined that the coupling sleeve 6 is close to the idle gear with the coupling sleeve 6 not synchronized with the idle gear in the number of revolutions due to a trouble such as an abrasion of the synchronizer ring 8.

If the shift operation is continued directly, the coupling sleeve 6 comes to abut against the idle gear without achieving the synchronization between them in the number of revolutions, thereby causing a gear squeak. Therefore, in this condition, the control branches to step 40 in FIG. 14, where the voltage determination section 24 stops the active shift operation, thereby preventing an occurrence of a gear squeak. The features of determining the malfunction in the gear position in step 6 and step 7 correspond to gear position malfunction detecting means of the present invention.

On the other hand, unless the actual position Psc of the coupling sleeve 6 has reached the malfunction judgment position (Psc_chmf-α) (Psc<Psc_chmf-α), the control proceeds to step 9, where the compliance parameter calculating section 41 executes the compliance parameter VPOLE calculation processing by means of the aforementioned current feedback by switching the process 1 to the process 2.

The voltage determination section 24 then calculates the control input Vin to the shift motor 13 by means of the sliding mode controller 40 using the compliance parameter VPOLE calculated in this way and applies the control input Vin to the shift motor 13.

Thus, in the process 2, the armature current Im of the shift motor 13 is maintained at the target current Im_cmd through the feedback processing of the armature current Im of the shift motor 13 and an output torque of the shift motor 13 is controlled at a fixed level, thereby achieving a stable pressing force of the coupling sleeve 6 against the synchronizer ring 8.

This prevents the coupling sleeve 6 from being pressed by the synchronizer ring 8 with an excess force that damages the synchronization mechanism 2.

In the process 3, in step 30, the target position setting section 22 sets the target position Psc_cmd of the coupling sleeve 6 over the chamfer position Psc_chmf. In the subsequent step 31, the compliance parameter calculating section 41 sets the compliance parameter VPOLE to a constant value X_VPOLE_END. The voltage determination section 24 calculates an applied voltage Vin to the shift motor 13 by means of the sliding mode controller 40 using the compliance parameter VPOLE (=X_VPOLE_END) and applies the applied voltage Vin to the shift motor 13 to halt the motion of the coupling sleeve 6 immediately.

This prevents the coupling sleeve 6 from being pressed with an excess force by the idle gear after the completion of the engagement between the coupling sleeve 6 and the idle gear and damaging the synchronization mechanism 2.

Subsequently, referring to FIG. 14, if the shift operation is halted by detecting the malfunction in the synchronization mechanism 2 in step 40, the voltage determination section 24 determines whether it is an upshift operation in the next step 41. If it is the upshift operation, the control branches to step 50, where it is determined whether the gear selection target value NGEAR_cmd is set to the sixth gear position (NGEAR_cmd=6). If it is set to the sixth gear position, the control branches to step 60, where the gear selection target value NGEAR_cmd is decreased by one (NGEAR_cmd←NGEAR_cmd−1). This causes the gear selection target value NGEAR_cmd to be set to the selected gear position used before the execution of the halted shift operation.

On the other hand, unless the gear selection target value NGEAR_cmd is set to the sixth gear position in step 50, the control proceeds to step 51, where the voltage determination section 24 checks that the engine 81 does not stall even after shifting into a one-step higher gear position. Unless the engine 81 stalls, the control proceeds to step 52, where the gear selection target value NGEAR_cmd is increased by one (NGEAR_cmd←NGEAR_cmd+1) Then, in step 45, the voltage determination section 24 executes the shift operation according to the updated gear selection target value NGEAR_cmd. This enables a continuous upshift operation, avoiding the malfunctioning gear position without stalling the engine 81.

If it is determined that shifting into the one-step higher gear position stalls the engine 81 in step 51, the control branches to step 60, where the voltage determination section 24 decreases the gear selection target value NGEAR_cmd by one (NGEAR_cmd←NGEAR_cmd−1). This causes the gear selection target value NGEAR_cmd to be set to the selected gear position used before the execution of the halted shift operation. Further, in step 45, the voltage determination section 24 executes the shift operation according to the updated gear selection target value NGEAR_cmd. This enables a continuous power transmission of the engine 81 via the transmission 80.

On the other hand, if the halted shift operation is not the upshift operation, but the downshift operation in step 41, the control proceeds to step 42, where the voltage determination section 24 determines whether the gear selection target value NGEAR_cmd is set to the first gear position (NGEAE_cmd=1). If the gear selection target value NGEAR_cmd is set to the first gear position, the control proceeds to step 70, where the gear selection target value NGEAR_cmd is increased by one (NGEAR_cmd←NGEAR_cmd+1). This causes the gear selection target value NGEAR_cmd to be set to the selected gear position used before the execution of the halted shift operation. Then, in step 45, the voltage determination section 24 performs the shift operation according to the updated gear selection target value NGEAR_cmd.

On the other hand, unless the gear selection target value NGEAR_cmd is set to the first gear position in step 42, the control proceeds to step 43, where the voltage determination section 24 checks that the number of revolutions of the engine 81 does not exceed a rated speed of revolution even after shifting into a one-step lower gear position. Unless the number of revolutions of the engine 81 exceeds the rated number of revolutions, the control proceeds to step 44, where the gear selection target value NGEAR_cmd is decreased by one (NGEAR_cmd←NGEAR_cmd−1). Then, in step 45, the voltage determination section 24 executes the shift operation according to the updated gear selection target value NGEAR_cmd. This enables a continuous downshift operation, avoiding the malfunctioning gear position while preventing the engine 81 from rotating by the number of revolutions exceeding the rated number of revolutions.

Moreover, if it is determined that shifting into a one-step lower gear position causes an over revolving of the engine 81 in step 43, the control branches to step 70, where the voltage determination section 24 increases the gear selection target value NGEAR_cmd by one (NGEAR_cmd←NGEAR cmd+1). This causes the gear selection target value NGEAR_cmd to be set to the selected gear position used before the execution of the halted shift operation. Then, in step 45, the voltage determination section 24 executes the shift operation according to the updated gear selected target value NGEAR_cmd. This enables a continuous power transmission of the engine 81 via the transmission 80 while preventing the engine 81 from rotating by the number of revolutions exceeding the rated number of revolutions.

In this embodiment, when the position Psc of the inertial object 30 reaches the target position Psc_cmd, switching is made from the control of determining the compliance parameter VPOLE according to the position of the inertial object 30 in the process 1 to the control of determining the compliance parameter VPOLE according to the pressing force (proportional to a magnitude of the armature current of the motor 10) against the elastic object 30 in the process 2 as stated above. Depending on specifications of a mechanism driven by an actuator, however, switching conditions of a control aspect can be set according to a variation of the armature current Im of the shift motor 13.

Furthermore, in this embodiment, the compliance parameter VPOLE is determined by the aforementioned calculation processing in the current feedback section 50a in the configuration shown in FIG. 8. In an alternative, however, as shown in FIG. 15, the compliance parameter VPOLE may be determined by using a current feedback section 50b having a correlation map 60 with a preset relation between the current difference (Im−Im_cmd) and the compliance parameter VPOLE and applying the current difference Im−Im_cmd) to the correlation map 60.

Still further, in another alternative, the compliance parameter VPOLE may be determined by performing an I-PD control by using a current feedback section 50c shown in FIG. 16. A subtractor 51, an adder 58, and a limiter 59 are the same as those designated by the same reference numerals in the current feedback section 50a shown in FIG. 8.

In the current feedback section 50c, the compliance parameter (VPOLE(k)) is calculated by the following equation (59) and equation (60). Specifically, a proportional arithmetic unit 61 calculates the second term in the right side of the following equation (59), a Z-transformer 62, a subtractor 63, and a differential arithmetic unit 64 calculate the third term in the right side of the equation (59), and a subtractor 51 and an integral multiplier 66 calculate the fourth term in the right side of the equation (59):

[Eq. 59]

$$VPOLE\_Im(k) = VPOLE\_bs + KIMP \cdot Im(k) + KIMD\{Im(k) - Im(k-1)\} + KIMI \cdot \sum_{i=0}^{k} E\_Im(j) \quad (59)$$

where VPOLE_Im(k) is a compliance parameter in the kth sampling period, VPOLE_bs is a reference value of the compliance parameter, KIMP is a feedback gain of a proportional, KIMD is a feedback gain of a differential, KIMI is a feedback gain of an integral, and Im(k) is armature current of the motor 10 in the kth sampling period.

[Eq. 60]

$$E\_Im(k) = Im(k) - Im\_cmd \quad (60)$$

where Im_cmd is a target current value.

Thereafter, an adder 67, an adder 68, and the adder 58 add the terms in the right side of the equation (59) to calculate VPOLE_Im(k) and the limiter 59 performs limiting processing of the equation (57) to determine the compliance parameter VPOLE(k).

Furthermore, the voltage determination section 24 uses the adaptive sliding mode having the adaptation law input with consideration given to an effect of a disturbance or the like in this embodiment. A general sliding mode control without the adaptation law input may be used or other types of response specification controls including a backstepping control may also be used. Still further, while the voltage determination section 24 performs the current feedback processing by using the sliding mode control, an execution of the current feedback processing without the sliding mode control also provides the effect of the present invention.

Furthermore, while the actual position grasping section 21 grasps the actual position Psc of the coupling sleeve 6 on the basis of the model shown in FIG. 3 in this embodiment, the actual position Psc of the coupling sleeve 6 may be grasped directly from a position detecting signal of a position sensor provided anew, a lever ratio between the motor 10 and the coupling sleeve 6, or the like.

While the shift motor 13 is used as an actuator of the present invention in this embodiment, the present invention can be applied even with the use of other types of electric actuators or pneumatic or hydraulic actuators.

What is claimed is:

1. A controller for controlling an operation of a transmission including a plurality of gear positions having a coupling sleeve integrally rotatable on an input shaft or an output shaft with a shift fork coupled to the coupling sleeve, idle gears arranged so as to be relatively rotatable on the shaft on which the coupling sleeve is arranged and not axially movable on the shaft and coupled to one of the input shaft and the output shaft where the coupling sleeve is not arranged, and a synchronizer ring for synchronizing the number of revolutions between the coupling sleeve and the idle gear by means of a frictional force by contacting the coupling sleeve with the idle gear in a shift operation, the synchronizer ring being arranged so as to be freely rotatable on the coupling sleeve and the idle gear and arranged so as to be movable in a direction of the shaft on which the coupling sleeve is arranged; and a shift actuator for engaging the coupling sleeve with the idle gear by axially moving the coupling sleeve with operating the shift fork of each gear-shift position, the controller comprising:

actual position grasping means for grasping an actual position of the coupling sleeve;

shift position control means for performing the shift operation of the transmission by determining a control input to the shift actuator so that an actual position of the coupling sleeve matches a predetermined target position; and gear position malfunction detecting means for detecting a malfunction in a gear position under execution of the shift operation when the actual position of the coupling sleeve has reached a malfunction judgment position set within a range from a balk point to just before a contact point between the coupling sleeve and the idle gear without causing a difference between the actual position and the target position of the coupling sleeve to be greater than or equal to a predetermined contact judgment value after starting the shift operation of the transmission.

2. The controller for the transmission according to claim 1, wherein the shift position control means halts the shift operation if the gear position malfunction detecting means detects a malfunction in the gear position where the shift operation is under execution.

3. The controller for the transmission according to claim 2, wherein:

the input shaft of the transmission is connected to an output shaft of a driving source; and if the gear position malfunction detecting means detects a malfunction in the gear position where upshift is under execution as the shift operation, the shift position control means performs a shift operation for a one-step higher gear position than the gear position where the malfunction is detected if it is possible to perform the shift operation for the one-step higher gear position without halting the driving source and performs a shift operation for a one-step lower gear position than the gear position where the malfunction is detected if it is impossible to perform the shift operation for the one-step higher gear position than the gear position where the malfunction is detected without halting the driving source.

4. The controller for the transmission according to claim 3, wherein:

the input shaft of the transmission is connected to the output shaft of the driving source; and if the gear position malfunction detecting means detects a malfunction in the gear position where downshift is under execution as the shift operation, the shift position control means performs a shift operation for a one-step lower gear position than the gear position where the malfunction is detected if it is possible to perform the shift operation for the one-step lower gear position with the number of revolutions of the driving source not exceeding the rated number of revolutions and performs a shift operation for a one-step higher gear position than the gear position where the malfunction is detected if it is impossible to perform the shift operation for the one-step lower gear position than the gear position where the malfunction is detected with the number of revolutions of the driving source not exceeding the rated number of revolutions.

5. The controller for the transmission according to claim 2, wherein:

the input shaft of the transmission is connected to an output shaft of a driving source; and if the gear position malfunction detecting means detects a malfunction in the gear position where downshift is under execution as the shift operation, the shift position control means performs a shift operation for a one-step lower gear position than the gear position where the malfunction is detected if it is possible to perform the shift operation for the one-step lower gear position with the number of revolutions of the driving source not exceeding the rated number of revolutions and performs a shift operation for a one-step higher gear position than the gear position where the malfunction is detected if it is impossible to perform the shift operation for the one-step lower gear position than the gear position where the malfunction is detected with the number of revolutions of the driving source not exceeding the rated number of revolutions.

6. The controller for the transmission according to claim 1, wherein:

the shift position control means determines the control input to the shift motor by using a response specification control with a variably specifiable damping behavior and damping speed of a difference between the actual position and the target position of the coupling sleeve so as to obtain matching between the actual position and the target position of the coupling sleeve in such a way as to converge a state quantity on an equilibrium point on a switching function defined by a linear function with the state quantity assumed a variable on an assumption that at least the difference is the state quantity and determines response characteristics of the response specification control by changing an operational coefficient of the linear function.

* * * * *